United States Patent
Steele et al.

(10) Patent No.: US 7,805,392 B1
(45) Date of Patent: Sep. 28, 2010

(54) PATTERN MATCHING IN A MULTIPROCESSOR ENVIRONMENT WITH FINITE STATE AUTOMATON TRANSITIONS BASED ON AN ORDER OF VECTORS IN A STATE TRANSITION TABLE

(75) Inventors: Kenneth M. Steele, Waltham, MA (US); Anant Agarwal, Weston, MA (US)

(73) Assignee: Tilera Corporation, Westborough, MA (US)

( * ) Notice: Subject to any disclaimer, the term of this patent is extended or adjusted under 35 U.S.C. 154(b) by 617 days.

(21) Appl. No.: 11/564,694

(22) Filed: Nov. 29, 2006

Related U.S. Application Data

(60) Provisional application No. 60/740,699, filed on Nov. 29, 2005.

(51) Int. Cl.
*G06N 5/02* (2006.01)
(52) U.S. Cl. .................................... 706/48
(58) Field of Classification Search ............ 706/48
See application file for complete search history.

(56) References Cited

U.S. PATENT DOCUMENTS

| | | | |
|---|---|---|---|
| 5,329,405 A | 7/1994 | Hou et al. | |
| 5,815,096 A | 9/1998 | Smith | |
| 5,831,883 A | 11/1998 | Suter et al. | |
| 5,956,724 A | 9/1999 | Griffiths | |
| 5,990,899 A | 11/1999 | Whitten | |
| 6,012,057 A | 1/2000 | Mayer et al. | |
| 7,394,288 B1 | 7/2008 | Agarwal | |
| 7,411,418 B2 * | 8/2008 | Gould et al. | 326/46 |
| 7,461,236 B1 | 12/2008 | Wentzlaff | |
| 2003/0051043 A1 | 3/2003 | Wyschogrod et al. | |
| 2003/0110154 A1 * | 6/2003 | Ishihara et al. | 707/1 |
| 2004/0162826 A1 * | 8/2004 | Wyschogrod et al. | 707/6 |
| 2005/0125650 A1 | 6/2005 | Chen et al. | |
| 2005/0132342 A1 | 6/2005 | Van Lunteren | |
| 2005/0286742 A1 | 12/2005 | Rasmussen et al. | |
| 2006/0020595 A1 | 1/2006 | Norton et al. | |
| 2006/0085389 A1 | 4/2006 | Flanagan et al. | |
| 2006/0193159 A1 | 8/2006 | Tan et al. | |

(Continued)

FOREIGN PATENT DOCUMENTS

WO   WO 2004/072796 A2   8/2004

OTHER PUBLICATIONS

Tan et al. "A High Throughput String Matching Architecture for Intrusion Detection and Prevention", ISCA, 2005, pp. 112-122).*

(Continued)

*Primary Examiner*—Michael B. Holmes
*Assistant Examiner*—Li-Wu Chang
(74) *Attorney, Agent, or Firm*—Fish & Richardson P.C.

(57) ABSTRACT

Pattern matching in a plurality of interconnected processing engines includes: accepting a stream of input sequences over an interface and storing the input sequences; storing instructions for matching an input sequence to one or more patterns in memory accessible by a first set of one or more processing engines, and storing instructions for matching an input sequence to one or more patterns in memory accessible by a second set of one or more processing engines; distributing information identifying selected input sequences to the first and second sets of processing engines; and retrieving the identified input sequences to perform pattern matching in the first and second sets of processing engines.

77 Claims, 11 Drawing Sheets

U.S. PATENT DOCUMENTS

| | | | |
|---|---|---|---|
| 2007/0005596 | A1 | 1/2007 | Brown et al. |
| 2007/0124146 | A1 | 5/2007 | Lunteren |

OTHER PUBLICATIONS

Agarwal, Anant. "Raw Computation," *Scientific American* vol. 281, No. 2: 44-47, Aug. 1999.

Taylor, Michael Bedford et. al., "Evaluation of the Raw Microprocessor: An Exposed-Wire-Delay Architecture for ILP and Streams," *Proceedings of International Symposium on Computer Architecture*, Jun. 2004.

Taylor, Michael Bedford et. al., "Scalar Operand Networks: On-Chip Interconnect for ILP in Partitioned Architectures," *Proceedings of the International Symposium on High Performance Computer Architecture*, Feb. 2003.

Taylor, Michael Bedford et. al., "A 16-Issue Multiple-Program-Counter Microprocessor with Point-to-Point Scalar Operand Network," *Proceedings of the IEEE International Solid-State Circuits Conference*, Feb. 2003.

Taylor, Michael Bedford et. al., "The Raw Microprocessor: A Computational Fabric for Software Circuits and General-Purpose Programs," *IEEE Micro*, pp. 25-35, Mar.-Apr. 2002.

Lee, Walter et. al., "Space-Time Scheduling of Instruction-Level Parallelism on a Raw Machine," *Proceedings of the Eighth International Conference on Architectural Support for Programming Languages and Operating Systems (ASPLOS-VIII)*, San Jose, CA, Oct. 4-7, 1998.

Kim, Jason Sungtae et. al., "Energy Characterization of a Tiled Architecture Processor with On-Chip Networks," *International Symposium on Low Power Electronics and Design*, Seoul, Korea, Aug. 25-27, 2003.

Barua, Rajeev et. al., "Compiler Support for Scalable and Efficient Memory Systems," *IEEE Transactions on Computers*, Nov. 2001.

Waingold, Elliot et. al., "Baring it all to Software: Raw Machines," *IEEE Computer*, pp. 86-93, Sep. 1997.

Lee, Walter et. al., "Convergent Scheduling," *Proceedings of the 35th International Symposium on Microarchitecture*, Istanbul, Turkey, Nov. 2002.

Wentzlaff, David and Anant Agarwal, "A Quantitative Comparison of Reconfigurable, Tiled, and Conventional Architectures on Bit-Level Computation," *MIT/LCS Technical Report LCS-TR-944*, Apr. 2004.

Suh, Jinwoo et. al., "A Performance Analysis of PIM, Stream Processing, and Tiled Processing on Memory-Intensive Signal Processing Kernels," *Proceedings of the International Symposium on Computer Architecture*, Jun. 2003.

Barua, Rajeev et. al., "Maps: A Compiler-Managed Memory System for Raw Machines," *Proceedings of the Twenty-Sixth International Symposium on Computer Architecture (ISCA-26)*, Atlanta, GA, Jun. 1999.

Barua, Rajeev et. al., "Memory Bank Disambiguation using Modulo Unrolling for Raw Machines," *Proceedings of the Fifth International Conference on High Performance Computing*, Chennai, India, Dec. 17-20, 1998.

Agarwal, A. et. al., "The Raw Compiler Project," *Proceedings of the Second SUIF Compiler Workshop*, Stanford, CA, Aug. 21-23, 1997.

Taylor, Michael Bedford et. al., "Scalar Operand Networks," *IEEE Transactions on Parallel and Distributed Systems (Special issue on On-Chip Networks)*, Feb. 2005.

Taylor, Michael. The Raw Prototype Design Document V5.01 [online]. Department of Electrical Engineering and Computer Science, Massachusetts Institute of Technology, Sep. 6, 2004 [retrieved on Sep. 25, 2006]. Retrieved from the Internet: <ftp://ftp.cag.los.mit.edu/pub/raw/documents/RawSpec99.pdf>.

Moritz, Csaba Andras et. al., "Hot Pages: Software Caching for Raw Microprocessors," *MIT/LCS Technical Memo LCS-TM-599*, Aug. 1999.

Dharmapurikar, S. & J. Lockwood. "Fast and Scalable Pattern Matching for Content Filtering," *ANCS'05*, Oct. 26-28, 2005, Princeton, New Jersey, USA.

Tan, L. & T. Sherwood., "Architectures for Bit-Split String Scanning in Intrusion Detection," *IEEE Computer Society*, Jan.-Feb. 2006 (pp. 1-9).

Lin Tan; Sherwood, T., "A high throughput string matching architecture for intrusion detection and prevention", International Symposium on Computer Architecture (ISCA'05), 2005.

Benjamin C. Brodie, David E. Taylor, Ron K. Cytron, "A Scalable Architecture for High-Throughput Regular-Expression Pattern Matching," pp. 191-202, International Symposium on Computer Architecture (ISCA'06), 2006.

Wiklund et al., SoCBUS: Switched network on chip for hard real time systems, Apr. 22-26, 2003, Proceeds of the Int'l Parallel and Distributed Processing Symposium (IPDPS), pp. 78-85.

Norton, Marc. "Optimizing Pattern matching for intrusion detection," 2004, Sourcefire Inc., White Paper.

Takeda et al., Pattern Matching Machine for Text Compressed Using Finite State Model, Oct. 1997, DOI Technical Report, DOI-TR-142.

Aho et al., Efficient String Matching: An Aid to Bibliographic Search, Jun. 1975, Communications of the ACM, vol. 18 No. 6, pp. 333-340.

Amir et al., Efficient Pattern Matching with Scaling, Mar. 1992, Journal of Algorithms, pp. 344-357.

Kida et al., Multiple Pattern Matching in LZW Compressed Text, Mar. 30-Apr. 1, 1998, Data Compression Conference, 1998, DCC 98 Proceedings, pp. 103-112.

* cited by examiner

PATTERN MATCHING IN A MULTIPROCESSOR ENVIRONMENT WITH FINITE STATE AUTOMATON TRANSITIONS BASED ON AN ORDER OF VECTORS IN A STATE TRANSITION TABLE

CROSS-REFERENCE TO RELATED APPLICATIONS

This application claims priority to Provisional U.S. Application Ser. No. 60/740,699, filed on Nov. 29, 2005, incorporated herein by reference.

BACKGROUND

The invention relates to pattern matching in a multiprocessor environment.

Pattern matching (also called string matching) finds occurrences of a string (the pattern) in an input stream of characters. Multiple pattern matching finds occurrences of each string in a set of strings (the patterns) in an input stream of characters. For example, the strings "this" and "fox" occur in the input stream "this is a fox and this is not a fox" at positions 0 and 19 for "this" and positions 10 and 32 for "fox". The sequence of characters that make up the patterns and that occur in the input stream can come from an arbitrary alphabet, including a standardized character set (e.g., ASCII characters) or any other set of identifiable symbols.

Multiple pattern matching can be performed using multiple sets of patterns, where the input stream of characters is checked against all the patterns in one, or more, of the pattern sets. In some cases, each pattern set is independent of all the other pattern sets.

Multiple pattern matching can be used for Intrusion Detection Systems (IDS) and Intrusion Prevention Systems (IPS) in networking applications. The data rates in these systems can be over 1 GByte/sec. In some cases, different sets of patterns are used to check different types of network packets. Some packets are checked against more than one pattern set.

Pattern matching can also be used for virus scanning. The virus signatures are typically longer than the patterns in IDS/IPS rules, but pattern matching can be implemented in a similar manner.

Some important metrics for a pattern matching system are the rate at which it can process the stream of input characters to be searched and the amount of memory needed to store the set of patterns.

Pattern matching can be used for other applications; e.g., "Data Classification" in smart switches inside a Storage Area Network (SAN). Some storage systems virtualize data file storage based on the types of the files to be stored. The file type and content determine where in the SAN the corresponding file is to be stored. Determination of such fields within files in real time can be performed using pattern matching.

SUMMARY

In one aspect, in general, a method for pattern matching in a plurality of interconnected processing engines includes: accepting a stream of input sequences over an interface and storing the input sequences; storing instructions for matching an input sequence to one or more patterns in memory accessible by a first set of one or more processing engines, and storing instructions for matching an input sequence to one or more patterns in memory accessible by a second set of one or more processing engines; distributing information identifying selected input sequences to the first and second sets of processing engines; and retrieving the identified input sequences to perform pattern matching in the first and second sets of processing engines.

Aspects can include one or more of the following features.

The method further comprises assigning input sequences to the first and second sets of processing engines based on status information from the sets of processing engines.

The status information comprises an indication of a work load on a set of processing engines.

Information identifying an accepted input sequence is distributed to a set of processing engines that have the lowest work load.

The indication of the work load comprises at least one of a number of input sequences currently being processed and a number of input sequences in an input queue.

The method further comprises assigning input sequences to the first and second sets of processing engines based on an identified class of a packet that includes the input sequence.

At least one of the sets of processing engines is dedicated to performing pattern matching for input sequences in packets of a corresponding class.

The method further comprises gathering results of the pattern matching performed by the first set of one or more processing engines and the second set of one or more processing engines.

The instructions stored in the memory accessible to the first set of processing engines comprise a program corresponding to a finite state automaton.

The finite state automaton includes states corresponding to a keyword tree of a Aho-Corasick pattern matching technique.

The memory accessible to the first set of processing engines stores data specifying transitions among states associated with the finite state automaton.

The first set of processing engines performs a first of the following functions in a first subset of the processing engines and a second of the following functions in a second subset of the processing engines that does not overlap with the first subset: translating symbols within an input sequence based on an order associated with subsets of the specified transitions; determining a transition from a current state to a next state based on a translated symbol and the stored data; and determining an output rule in response to determining that an input sequence matches a pattern.

The first set of processing engines performs all three of the functions in different non-overlapping subsets of processing engines.

Translating symbols within an input sequence further comprises translating uppercase and lowercase versions of letters to a single case.

The finite state automaton includes one or more states associated with transitions corresponding to a deterministic finite automaton and one or more states associated with transitions corresponding to a non-deterministic finite automaton.

The memory accessible by the first set of processing engines and the memory accessible by the second set of processing engines comprise memory caches within the respective processing engines.

The instructions stored in the memory accessible by the first set of processing engines comprise an active portion of a program corresponding to a finite state automaton.

The instructions stored in the memory accessible by the first set of processing engines comprise at least a portion of a program corresponding to a finite state automaton for matching a first set of patterns, and the instructions stored in the memory accessible by the second set of processing engines comprise at least a portion of a program corresponding to a finite state automaton for matching a second set of patterns different from the first set of patterns.

The method further comprises processing a specification of transitions among states associated with a finite state automaton for matching an input sequence to one or more patterns to generate data specifying the transitions based on storage constraints of the memory caches of the first set of processing engines.

The data is small enough to fit in the memory caches of the first set of processing engines.

Processing the specification of transitions to generate the data based on the storage constraints comprises selecting an order associated with subsets of the transitions.

Processing the specification to generate the data based on the storage constraints comprises generating a representation of the finite state automaton in which one or more of the states are associated with transitions corresponding to a deterministic finite automaton and one or more states are associated with transitions corresponding to a non-deterministic finite automaton.

The instructions stored in the memory accessible by the first set of processing engines comprise at least a portion of a first program corresponding to a first finite state automaton, and the instructions stored in the memory accessible by the second set of processing engines comprise at least a portion of a second program corresponding to a second finite state automaton different from the first finite state automaton.

The instructions stored in the memory accessible by the first set of processing engines are stored before the stream of input sequences are accepted over the interface.

The instructions stored in the memory accessible by the second set of processing engines are stored after at least some of the input sequences have been accepted over the interface.

The instructions stored in the memory accessible by the first set of processing engines are stored after at least some of the input sequences have been accepted over the interface.

The instructions stored in the memory accessible by the first set of processing engines are stored while the second set of processing engines are processing input sequences.

The first set of processing engines starts processing input sequences according to its stored instructions after the second set of processing engines finishes processing input sequences according to its stored instructions.

The first finite state automaton matches an input sequence to one or more case-sensitive patterns.

The second finite state automaton matches an input sequence to one or more case-insensitive patterns.

The input sequences comprise segments of a character stream.

The first and second sets of processing engines perform pattern matching to the same patterns.

At least some of the segments include the same portion of the character stream.

Each set of processing engines processes a given segment starting from an initial state.

At least some of the segments processed by the first set of processing engines include the same portion of the character stream as a segment processed by the second set of processing engines.

The portion of the character stream that is the same in a first segment and a second segment is one character shorter than a maximum length of the patterns being matched in the first and second sets of processing engines.

The method further comprises gathering results of the pattern matching performed by the first set of one or more processing engines and the second set of one or more processing engines.

Gathering results of the pattern matching includes filtering the results to identify a portion of the character stream matched in more than one input sequence.

Each set of processing engines processes a given segment starting from a state determined after processing a previous segment.

At least some of the input sequences each comprise at least a portion of a packet.

At least some of the input sequences each comprise a payload of a packet.

In another aspect, in general, a system for pattern matching includes: a plurality of interconnected processing engines; an interface to at least one of the processing engines configured to accept a stream of input sequences; memory accessible by a first set of one or more processing engines that stores instructions for matching an input sequence to one or more patterns; and memory accessible by a second set of one or more processing engines that stores instructions for matching an input sequence to one or more patterns. At least one processing engine is configured to distribute information identifying selected input sequences to the first and second sets of processing engines. The first and second sets of processing engines are configured to retrieve the identified input sequences to perform pattern matching.

In another aspect, in general, a method for pattern matching includes accepting at least one input sequence of symbols over an interface; accepting a specification of transitions among states associated with a finite state automaton for matching an input sequence to one or more patterns, wherein each transition is associated with at least one symbol; selecting an order associated with subsets of the transitions; storing data that specifies the transitions according to the selected order; and determining whether the accepted input sequence matches a pattern based on the stored data.

Aspects can include one or more of the following features.

The order associated with the subsets is selected based on reducing the size of the stored data that specifies the transitions.

Determining whether the accepted input sequence matches a pattern comprises, for each input symbol in the input sequence: determining a subset of the transitions that corresponds to the input symbol; and determining a transition from a current state to a next state based on the determined subset and the stored data that specifies the transitions.

Determining the subset of the transitions that corresponds to the symbol comprises translating input symbol based on the selected order.

The input symbol comprises an input character, the specification of the transitions comprises a state transition table having a first dimension corresponding to states and a second dimension corresponding to input characters, and each subset comprises a vector in the first dimension associated with a respective input character that specifies next state transitions for each current state.

The data that specifies the transitions according to the selected order defines an order of the vectors associated with respective input characters that is different from the order of the vectors in the state transition table.

The data that specifies the transitions according to the selected order comprises: a subset of consecutive components of a vector in the second dimension of the state transition table associated with a current state and specifying next state transitions for each input character that excludes transitions to an initial state of the finite state automaton before and after the subset, and data that indicates a relative position of the subset of consecutive components within the vector.

The data that indicates the relative position includes the smallest of the relative positions of the consecutive components.

The data that indicates the relative position further includes the largest of the relative positions of the consecutive components.

The data that indicates the relative position further includes data based on the number of consecutive components in the subset.

The input character associated with a given vector in the first dimension of the state transition table is determined by the position of the given vector in the table.

Translating the input symbol based on the selected order comprises translating the input character according to the change in position of a given vector between the state transition table and the data that specifies the transitions according to the selected order.

Translating the input symbol further comprises translating uppercase and lowercase versions of letters into a single case.

Translating the input symbol further comprises translating each of multiple symbols not appearing in the patterns into a single symbol not appearing in the patterns.

Translating the input symbol further comprises translating two symbols not appearing in the patterns and all the symbols between them into a single symbol not appearing in the pattern if the number of symbols between them are fewer than the minimum number of symbols in any of the patterns.

The order associated with the subsets is selected based on placing a first portion of the stored data that specifies transitions from a first state close to a second portion of the stored data that specifies transitions from a second state, wherein there is at least one transition from the first state to the second state.

The input symbol comprises an input character, the specification of the transitions comprises a state transition table having a first dimension corresponding to states and a second dimension corresponding to input characters, and each subset comprises a vector in the second dimension that specifies next state transitions from a given current state for each input character.

The first portion and the second portion are stored close enough to be mapped to the same cache line.

In another aspect, in general, a system for pattern matching includes: a plurality of interconnected processing engines; an interface to at least one of the processing engines configured to accept at least one input sequence of symbols; and memory accessible by one or more of the processing engines that stores data that specifies transitions among states associated with a finite state automaton for matching an input sequence to one or more patterns, wherein each transition is associated with at least one symbol. At least one of the processing engines is configured to translate input symbols in the input sequence according to an order associated with subsets of the transitions. At least one of the processing engines is configured to determine whether the accepted input sequence matches a pattern based on the stored data that specifies the transitions.

In another aspect, in general, a method for pattern matching includes accepting at least one input sequence of symbols over an interface; accepting a specification of transitions among states associated with a finite state automaton for matching an input sequence to one or more patterns, wherein one or more of the states are associated with transitions corresponding to a deterministic finite automaton and one or more states are associated with transitions corresponding to a non-deterministic finite automaton; storing data that specifies the transitions; and determining whether the accepted input sequence matches the pattern based on the stored data.

Aspects can include one or more of the following features.

At least some of the transitions corresponding to a non-deterministic finite automaton fail to a state associated with transitions corresponding to a deterministic finite automaton.

All of the transitions corresponding to a non-deterministic finite automaton fail to a state associated with transitions corresponding to a deterministic finite automaton.

All of the transitions corresponding to a non-deterministic finite automaton fail to the same failure state.

The failure state comprises an initial state of the finite state automaton.

The failure state comprises a state to which the largest number of transitions terminate.

The finite state automaton does not include any direct transitions to children of the failure state from a state other than the failure state.

Determining whether the accepted input sequence matches the pattern comprises, for a given symbol in the input sequence, accessing a first portion of the stored data that determines a transition from a current state in parallel with accessing a second portion of the stored data that determines a transition from a state to which the current state transitions if the given symbol fails to match a specified transition from the current state.

Accessing the first and second portions of the stored data in parallel comprises accessing the first and second portions in different execution units of a processing engine.

Accessing the first and second portions of the stored data in parallel comprises accessing the first and second portions in different processing engines of an interconnected network of processing engines.

Accessing the first and second portions of the stored data in parallel comprises overlapping execution of instructions associated with accessing the first and second portions in a pipeline.

In another aspect, in general, a system for pattern matching includes: a plurality of interconnected processing engines; an interface to at least one of the processing engines configured to accept at least one input sequence of symbols; and memory accessible by one or more of the processing engines that stores data that specifies transitions among states associated with a finite state automaton for matching an input sequence to one or more patterns, wherein one or more of the states are associated with transitions corresponding to a deterministic finite automaton and one or more states are associated with transitions corresponding to a non-deterministic finite automaton. At least one of the processing engines is configured to determine whether the accepted input sequence matches the pattern based on the stored data that specifies the transitions.

Aspects can include one or more of the following advantages.

Pattern matching in a multiprocessor environment can enable multiple sets of patterns to be concurrently matched in respective pattern matchers against a stream of incoming input sequences taken, for example, from a stream of packets. In some cases, multiple instances of a given pattern matcher that matches a set of patterns can be executed concurrently on different portions of the input sequences. The pattern matchers can retrieve the sequences to be matched from memory based on distributed information identifying the sequences.

Thus, it is not necessary to distribute multiple copies of the input sequences over a network of interconnected processing engines.

Data that specifies transitions among states of a finite state automaton for pattern matching can be stored in a format that is compact and efficiently accessible. For example, by reordering columns of a transition table associated with input characters, the rows of the table representing state transition vectors can be stored in a more compact format. In multiprocessing environments that have many interconnected processing engines, the local memory available for each processing engine can be used more efficiently. By generating a finite state automaton in which one or more of the states are associated with transitions corresponding to a deterministic finite automaton and one or more states are associated with transitions corresponding to a non-deterministic finite automaton, the memory storage space needed can be smaller than for a deterministic finite automaton, and the access speed can be faster than for a non-deterministic finite automaton.

Other features and advantages will become apparent from the following description, and from the claims.

DESCRIPTION

1 Pattern Matching

Pattern matching can be efficiently performed in a multiprocessor environment for any of a variety of applications such as virus detection, deep packet inspection, or regular expression matching, for example. The multiprocessor environment can include a multi-core processor or an interconnected network of processors, such as the tiled multiprocessor architecture described in more detail below. The multiprocessor environment provides interconnected processing engines that can be used to perform pattern matching on an input stream using different sets of patterns, and/or to perform pattern matching on different portions of an input stream using the same sets of patterns.

1.1 System Overview

Figure 1:
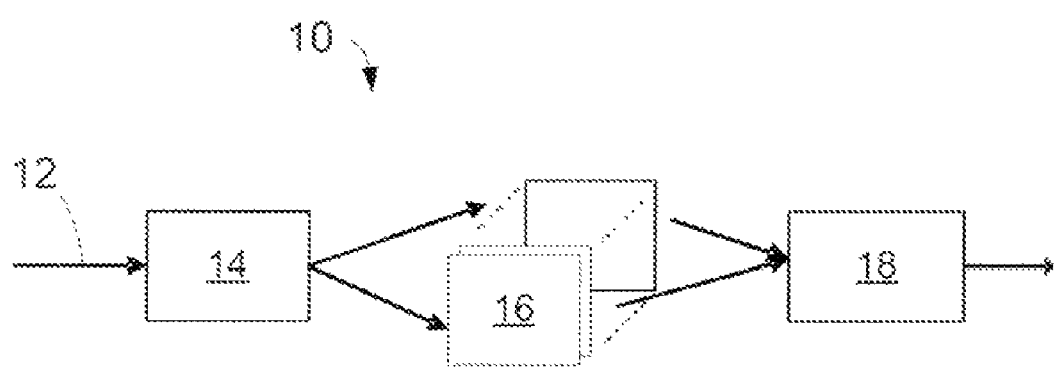
FIG. 1 is a diagram of a pattern matching system.

Referring to FIG. 1, a system 10 of interconnected modules, each running on one or more processing engines of a multiprocessing environment, performs pattern matching to implement a deep packet inspection function. A stream 12 of data packets, each representing an input sequence to be inspected, enters the system 10 over a network interface (e.g., XAUI, PCI Express, 10/100/1000 Ethernet). The packets can be stored in and accessed from memory that is dedicated to specific processing engines, or memory that is shared among multiple processing engines.

A program implementing a finite state automaton (FSA) for pattern matching an input sequence to a set of patterns is compiled into a sequence of instructions to be executed in one or more of the processing engines of an FSA module. These "FSA instructions" are initially stored in an external shared memory, with some of the instructions being stored within a dedicated memory cache of the processing engines of the corresponding FSA module.

One or more processing engines provide a load balancer module 14 which accepts packets or packet headers from the packet stream 12. The load balancer module 14 then distributes information identifying a packet, for example, a pointer or an ID relating to the packet, to a set of FSA modules 16 which perform pattern matching on the identified packets. The information is distributed over data paths coupling the processing engines. Packet data representing an input sequence are fetched from memory by the FSA modules. Multiple FSA modules can pattern match to the same set of patterns by running an instance of the same FSA, enabling parallel processing of many packets.

A gathering module 18 collects information relating to the deep packet inspection from the FSA modules 16. This information can be sent from FSA modules to the gathering module 18 over data paths connecting the processing engines, or from shared memory accessible to the FSA modules and the gathering module 18.

The number of FSA modules used to perform the pattern matching can change depending on the bandwidth needed to process the packet stream 12. In some cases, a single FSA module may be used. An FSA module periodically sends status information to the load balancer module 14 indicating that it is available to perform pattern matching. This status information can include an indication of the work load such as the number of packets currently being processed and/or in an input queue. The load balancer module 14 then uses this status information to adjust when it assigns a packet to that FSA module (e.g., a packet is assigned to the FSA module with the lowest work load). This status information may also be used to adjust the number and rate of packet assignment by the load balancer module 14 to the FSA modules. Alternatively, packets can be assigned to some FSA modules according to a class of the packet (e.g., a priority level of the packet or a type of content carried in the payload). For example, an FSA module can be dedicated to performing pattern matching for packets of a corresponding class.

Some of the modules in the system 10 can be combined to run in the same set of one or more processing engines. The configuration of the system 10 can be modified based on a mode of operation. There is a mode in which all of the modules of the system 10 are able to run on a single processing engine.

During packet inspection, if the system 10 detects a condition associated with a packet (e.g., based on one or more matched patterns), the system 10 informs another processing engine which can act as a host controller. Alternatively, an external computer or processor can act as a host controller. In some implementations, the host controller can then send a message to a console indicating the detected condition which can be viewed by a human operator.

For a packet for which an associated condition is detected, the system 10 can optionally send the packet onward over a network interface, or prevent the packet from going forward (e.g., discarding the packet). The system 10 would then send a negative acknowledgement (NACK) to the sender of the packet indicating that the packet did not go through.

1.2 Exemplary Pattern Matching Technique

An exemplary pattern matching technique that can be performed by the pattern matching FSAs is the Aho-Corasick pattern matching technique. For example, Snort® is an open source network intrusion prevention and detection system that uses an Aho-Corasick technique to inspect packets on an IP network. The patterns are known ahead of time and can be processed and optimized off-line. Data from payloads of received packets provide a stream of input sequences that can be processed on-line in real-time.

The Aho-Corasick technique detects patterns using an FSA in which transitions from one state to another are based on individual input characters within an input sequence. As characters from an input sequence are processed, each current state represents the longest pattern prefix that matches a consecutive string of recently processed characters from input sequence. The initial state of the FSA does not represent a match to any processed input characters and is the starting state for each new input sequence.

Figure 2A:
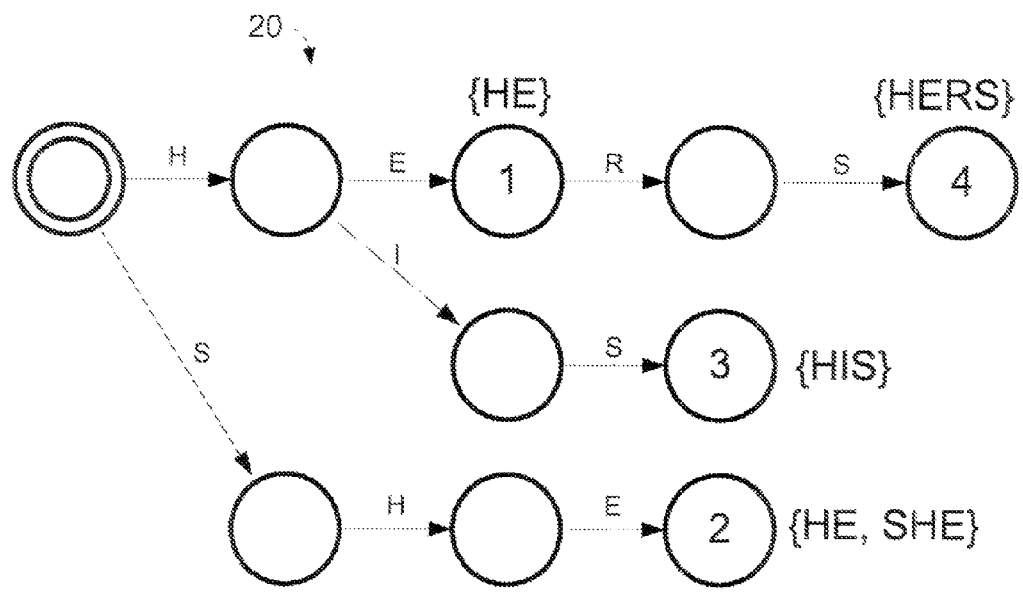
FIG. 2A is a diagram of a key word tree.

Referring to FIG. 2A, the states of the FSA and a set of "success transitions" can be represented by a directed graph called a "keyword tree" 20. In this example, the set of patterns to be matched is {HE, SHE, HIS, HERS}. Each node in the tree 20 represents a state associated with a prefix for at least one pattern in the set (or a complete pattern). The edges of the tree 20 represent transitions from one state to another. An edge leading to a given node is labeled with the last character of any pattern or prefix associated with the node. In this example, the numbers 1, 2, 3, 4 label states associated with a subset of one or more complete patterns. State 1 is associated with pattern subset {HE}; state 2 is associated with pattern subset {HE, SHE}; state 3 is associated with pattern subset {HIS}; and state 4 is associated with pattern subset {HERS}. These "match states" may be associated with certain rules that can be triggered upon detection of a pattern match.

The FSA includes other transitions in addition to the success transitions associated with the keyword tree. The manner in which those transitions are processed by the FSA depends on the type of FSA being implemented.

For example, one type of FSA is Non-deterministic Finite Automaton (NFA). An NFA includes, for each state, a next state transition for each input character that matches a pattern upon transition to another state, and a "failure transition" (also called a "failure pointer") that is followed when an input character does not match any success transition. When an NFA failure transition is followed for all but the initial state, the same input character processed in the previous state is processed again in the next state. This could potentially result in following another failure transition at the next state. NFAs are "non-deterministic" in that the history of input characters that have been received starting from an initial state does not necessarily fully determine the current state in an NFA, and the number of transitions per input character can vary. The NFA facilitates a compact storage format that does not consume a large amount of memory, potentially at the expense of processing speed since there can be multiple transitions (and corresponding memory accesses) for a given input character. However, the small size of the NFA can also contribute to faster processing in some multiprocessing systems since more of the FSAs may be able to fit into a fast local memory cache.

Figure 2B:
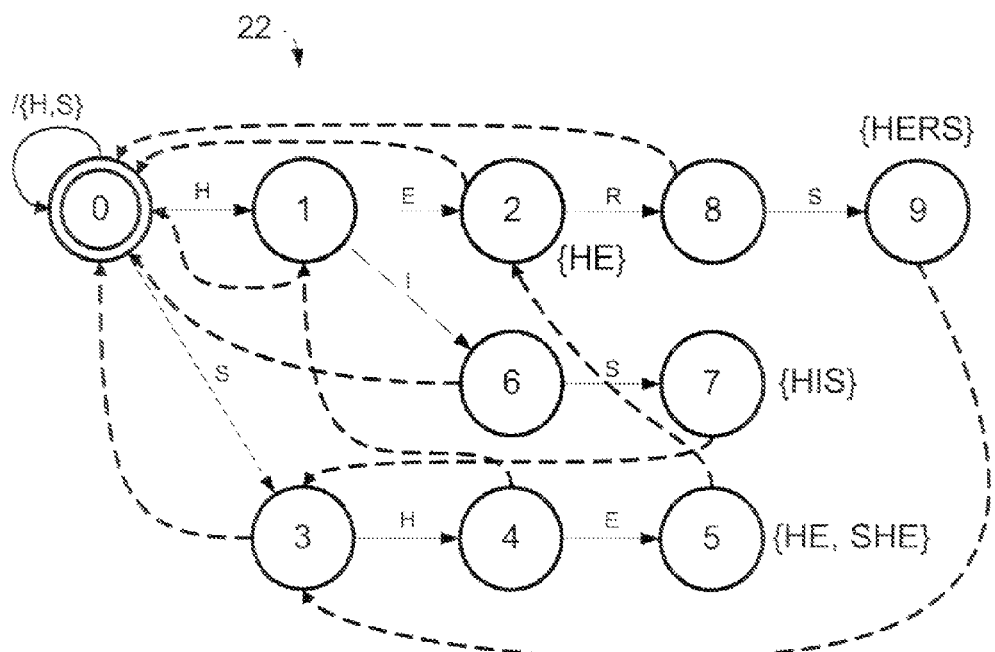
FIGS. 2B and 2C are state transition diagrams.

Referring to FIG. 2B, an NFA state transition diagram 22 for the keyword tree 20 of FIG. 2A shows failure transitions for non-initial states (labeled 1-9), where the "non-matched" input character is processed again at the next state, as dashed arrows. The initial state (labeled 0) transitions back to itself when an input character does not match an outgoing labeled transition, and the next input character is processed.

Another type of FSA is a Deterministic Finite Automaton (DFA). A DFA specifies a predetermined next state transition from a given current state for each character in the input alphabet. For a DFA, a new input character is processed for each transition to a next state. Thus, it is not necessary to distinguish between "success transitions" and "failure transitions" in a DFA. In a DFA, the history of input characters that have been received starting from an initial state determines the current state, and there is transitions per input character.

Figure 2C:
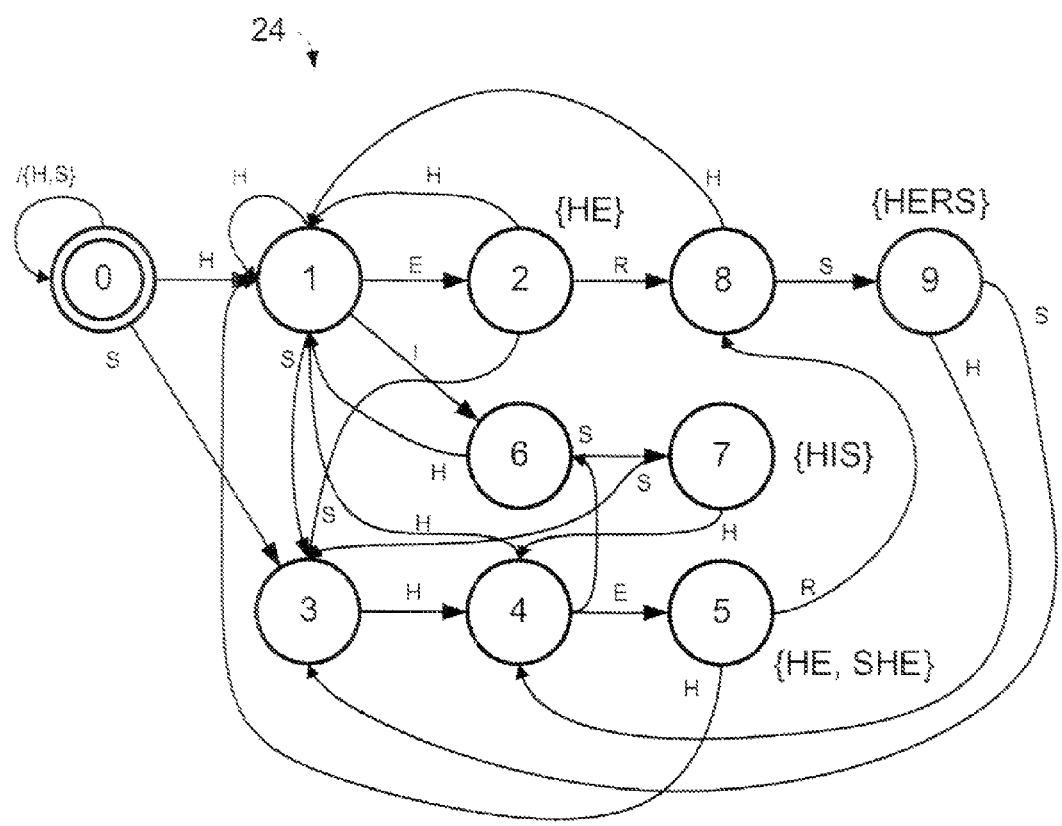

Referring to FIG. 2C, a DFA state transition diagram 24 for the keyword tree 20 of FIG. 2A shows each transition from one state to another except for implicit transitions from each state to the initial state 0 upon receiving an input character other than those shown. (While these implicit transitions fail to match a prefix of a pattern, they are not "failure transitions" in the sense described above where the input character is processed again.) The transitions of a DFA can be represented by a state transition table that has one dimension corresponding to current state, and another dimension corresponding to received input character. The table stores, for a given pair of current state and input character, the predetermined next state. Even though some storage efficiency can be achieved by compactly encoding a sparse state transition table that includes many transitions to the initial state, storing the state transitions for a DFA typically consumes more memory than storing the state transitions of an NFA. However, processing speed is typically faster since a single predetermined next state is accessed for each input character.

2 Tiled Circuit Architecture Overview

Figure 3:
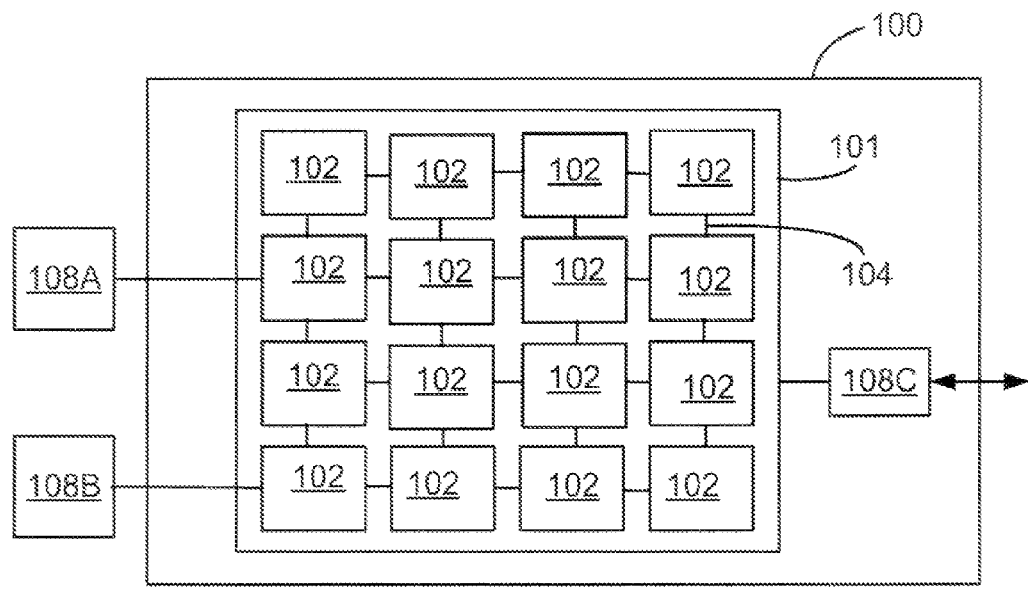
FIG. 3 is a block diagram of a tiled integrated circuit.

Referring to FIG. 3, an integrated circuit 100 (or "chip") includes an array 101 of interconnected tiles 102 that are an example of the interconnected processing engines used for pattern matching. Each of the tiles 102 is a functional unit that includes a processor and a switch that forwards data from other tiles to the processor and to switches of other tiles over data paths 104. The switch is coupled to the processor so that data can be sent to or received from processors of other tiles. The integrated circuit 100 includes other on-chip circuitry such as input/output (I/O) interface circuitry to couple data in and out of the circuit 100, and clock distribution circuitry to provide clock signals to the processors of the tiles.

The integrated circuit 100 shown in FIG. 3 includes a two-dimensional array 101 of rectangular tiles with data paths 104 between neighboring tiles to form a mesh network. The data path 104 between any two tiles can include multiple wires to support parallel channels in each direction. Optionally, specific sets of wires between two tiles can be dedicated to specific mesh networks that can operate independently. Alternative network configurations include networks having paths that extend to diagonal neighbors or to tiles that are multiple rows or columns away. Other configurations include higher dimensional mesh topologies. For example, multiple layered integrated circuits or other three-dimensional configurations can be used to form networks in which the connections form a cube of network nodes.

The data paths 104 from one or more tiles at the edge of the network can be coupled out of the array of tiles 101 (e.g., over I/O pins) to an on-chip device 108A, an off-chip device 108B, or a communication channel interface 108C, for example. Multiple wires of one or more parallel channels can be multiplexed down to a fewer number of pins or to a serial channel interface. For example, the wires for one or more channels can be multiplexed onto a high-speed serial link (e.g., SerDes, SPI-4.2, or SPI-5) or a memory controller interface (e.g., a memory controller for DDR, QDR SRAM, or Dynamic RAM). The memory controller can be implemented off-chip or in logic blocks within a tile or on the periphery of the integrated circuit 100.

The following exemplary implementations are described in the context of tiles that have the same structure and functionality. Alternatively there can be multiple "tile types" each having different structure and/or functionality. For example, tiles that couple data off of the integrated circuit 100 can include additional circuitry for I/O functions.

Figure 4:
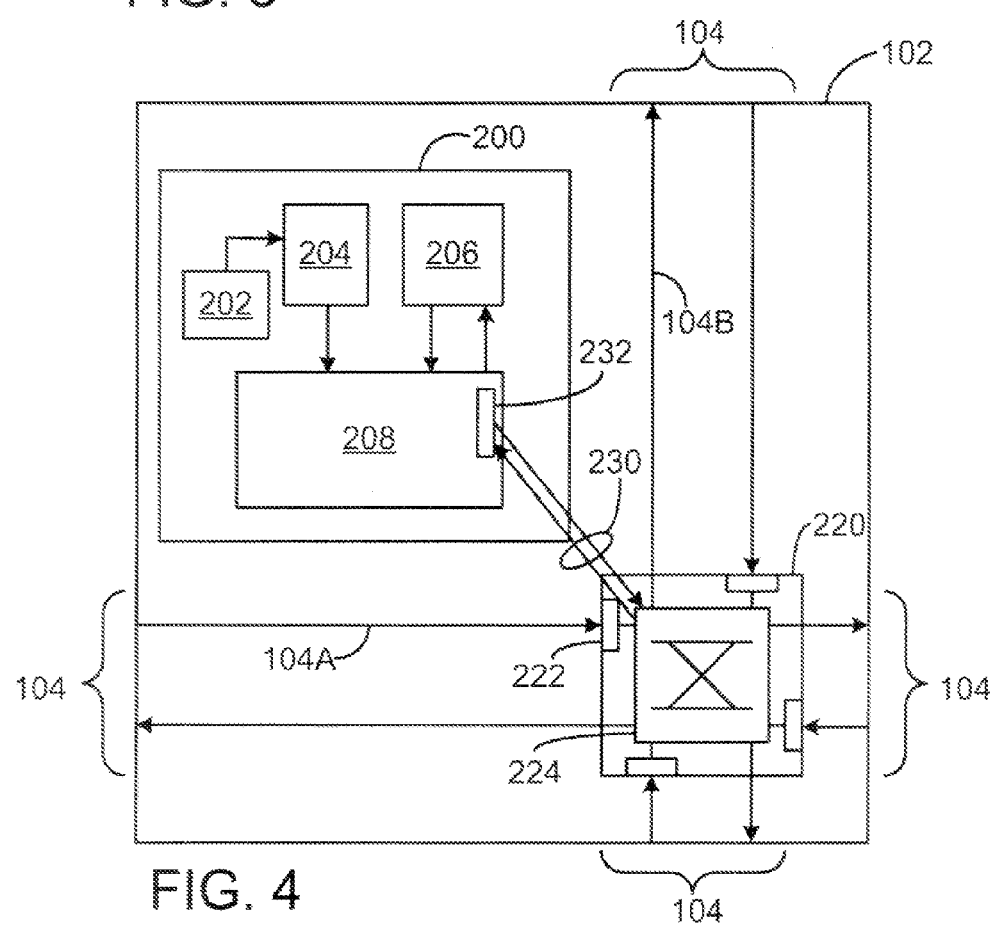
FIG. 4 is a block diagram of a tile.

Referring to FIG. 4, a tile 102 includes a processor 200, a switch 220, and sets of incoming wires 104A and outgoing wires 104B that form the data paths 104 for communicating with neighboring tiles. The processor 200 includes a program counter 202, an instruction memory 204, a data memory 206, and a pipeline 208. Either or both of the instruction memory 204 and data memory 206 can be configured to operate as a cache for off-chip memory. The processor 200 can use any of a variety of pipelined architectures. The pipeline 208 includes pipeline registers, functional units such as one or more arithmetic logic units (ALUs), and temporary storage such as a register file. The stages in the pipeline 208 include, for example, instruction fetch and decode stages, a register fetch stage, instruction execution stages, and a write-back stage. Whether the pipeline 208 includes a single ALU or multiple ALUs, an ALU can be "split" to perform multiple operations in parallel. For example, if the ALU is a 32-bit ALU it can be split to be used as four 8-bit ALUs or two 16-bit ALUs. The processor 200 can be multithreaded and have capabilities of a Very Long Instruction Word (VLIW) processor. The processor 200 can include other types of functional units such as a multiply accumulate unit, or a vector unit.

The switch 220 includes input buffers 222 for temporarily storing data arriving over incoming wires 104A, and switching circuitry 224 (e.g., a crossbar fabric) for forwarding data to outgoing wires 104B or the processor 200. The input buffering provides pipelined data channels in which data traverses a path 104 from one tile to a neighboring tile in predetermined number of clock cycles (e.g., a single clock cycle). This pipelined data transport enables the integrated circuit 100 to be scaled to a large number of tiles without needing to limit the clock rate to account for effects due to wire lengths such as propagation delay or capacitance. (Alternatively, the buffering could be at the output of the switching circuitry 224 instead of, or in addition to, the input.)

2.1 Switch Operation

A tile 102 controls operation of a switch 220 using either the processor 200, or separate switch processor dedicated to controlling the switching circuitry 224. Separating the control of the processor 200 and the switch 220 allows the processor 200 to take arbitrary data dependent branches without disturbing the routing of independent messages passing through the switch 220.

In some implementations, the switch 220 includes a switch processor that receives a stream of switch instructions for determining which input and output ports of the switching circuitry to connect in any given cycle. For example, the switch instruction includes a segment or "subinstruction" for each output port indicating to which input port it should be connected. In other implementations, the processor 200 receives a stream of compound instructions with a first instruction for execution in the pipeline 208 and a second instruction for controlling the switching circuitry 224.

In either case, these switch instructions enable efficient communication among the tiles for communication patterns that are known at compile time. This type of routing is called "static routing." An example of data that would typically use static routing are operands of an instruction to be executed on a neighboring processor.

The switch 220 also provides a form of routing called "dynamic routing" for communication patterns that are not necessarily known at compile time. In dynamic routing, circuitry in the switch 220 determines which input and output ports to connect based on header information in the data being dynamically routed. A tile can send a message to any other tile by generating the appropriate address information in the message header. The tiles along the route between the source and destination tiles use a predetermined routing approach (e.g., shortest Manhattan Routing). The number of hops along a route is deterministic but the latency depends on the congestion at each tile along the route. Examples of data traffic that would typically use dynamic routing are memory access traffic (e.g., to handle a cache miss) or interrupt messages.

The dynamic network messages can use fixed length messages, or variable length messages whose length is indicated in the header information. Alternatively, a predetermined tag can indicate the end of a variable length message. Variable length messages reduce fragmentation.

The switch 220 can include dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

As described above, the switch 220 is coupled to the processor 200 over processor coupling wires 230. For fast communication between tiles of neighboring processors, the coupling wires 230 can be integrated directly into the pipeline 208. The processor 200 can communicate with the switch 220 using distinct opcodes to distinguish between accesses to the static and dynamic network ports. Alternatively, the instructions can use register names to refer to switch ports.

For example, the processor can send or receive data by writing to or reading from a register interface that is directly mapped to the input buffers 222 of the switch 220. For data going to or coming from the processor 200, a switch instruction indicates that the switch 220 should direct data to a processor input buffer providing data to a pipeline stage or from a processor output buffer receiving data from a selected register or bypass path of the pipeline 208 (e.g., using a multiplexer). Any stage of the pipeline 208 can pull data from any input buffer 222 of the static or dynamic network (e.g., by mapping the input buffers 222 into a register file name space). This pipeline integration allows data to be available to the switch 200 the moment an instruction is executed and the register value is available. In the next cycle the same data could appear at an input buffer of another tile.

Figure 5A:
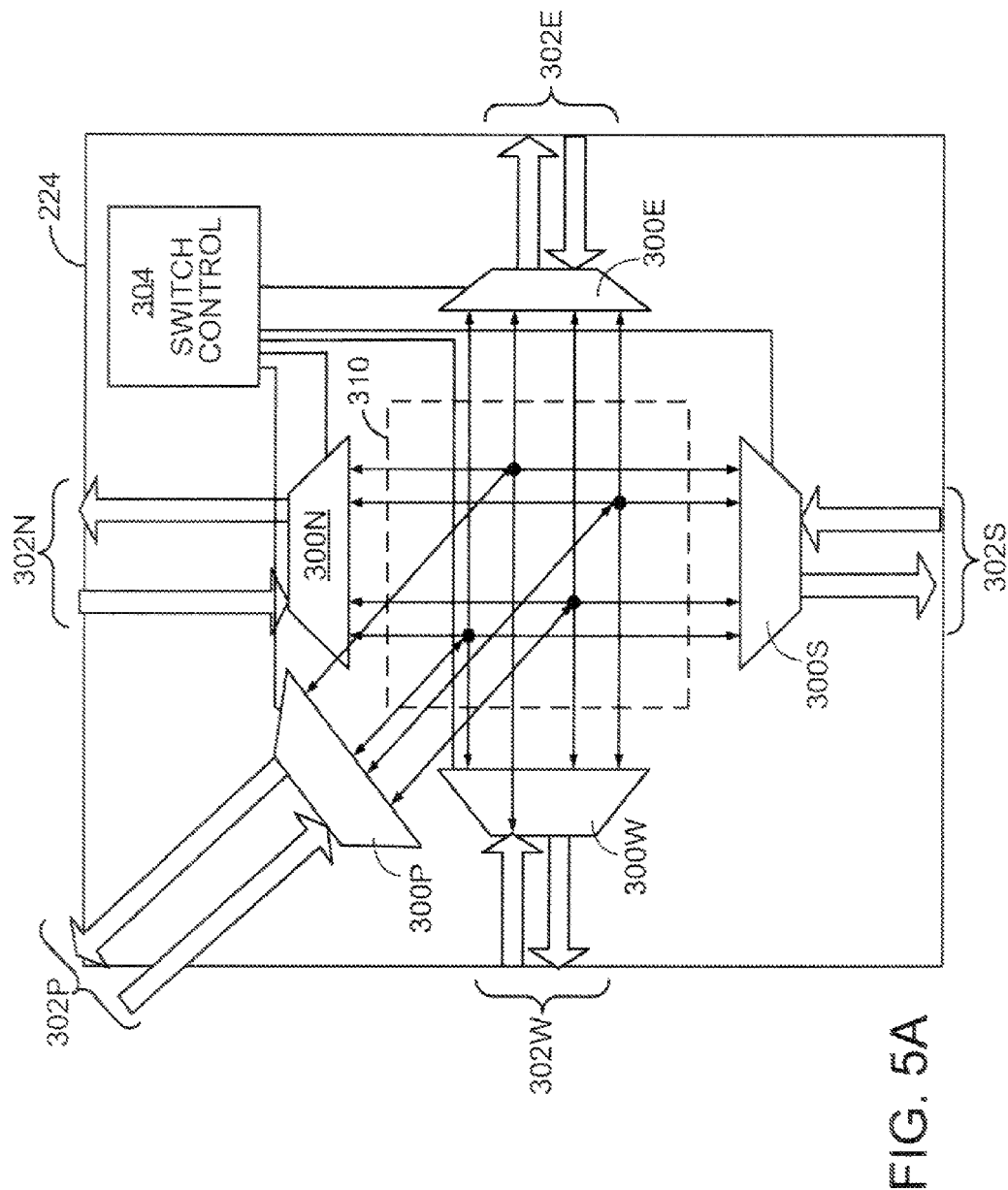
FIGS. 5A and 5B are diagrams of switching circuitry.

Referring to FIG. 5A, switching circuitry 224A includes five multiplexers 300N, 300S, 300E, 300W, 300P for coupling to the north tile, south tile, east tile, west tile, and local processor 200, respectively. Five pairs of input and output ports 302N, 302S, 302E, 302W, 302P are connected by parallel data buses to one side of the corresponding multiplexer. The other side of each multiplexer is connected to the other multiplexers over a switch fabric 310. In alternative implementations, the switching circuitry 224 additionally couples data to and from the four diagonally adjacent tiles having a total of 9 pairs of input/output ports. Each of the input and output ports is a parallel port that is wide enough (e.g., 32 bits wide) to couple a data word between the multiplexer data bus and the incoming or outgoing wires 104A and 104B or processor coupling wires 230.

A control module 304 selects which input port and output port are connected in a given cycle. The routing performed by the control module 304 depends on whether the switching circuitry 224 is part of the dynamic network or static network. For the dynamic network, the control module 304 includes circuitry for determining which input and output ports should be connected based on header information in the incoming data.

Figure 5B:
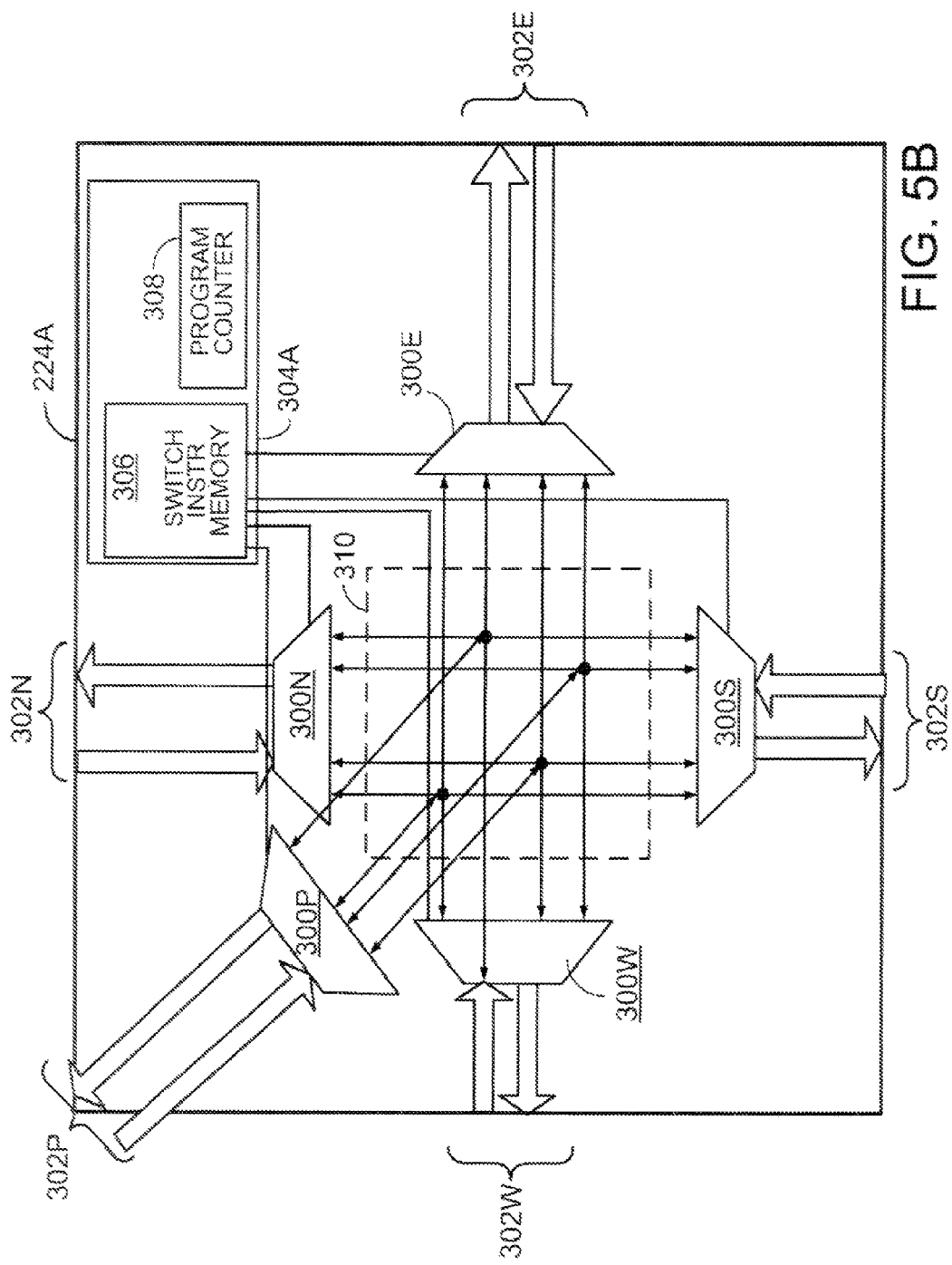

Referring to FIG. 5B, for the static network, the control module 304A of switching circuitry 224A includes a switch instruction memory 306 storing switch instructions that indicate which input and output ports should be connected. A switch instruction stored in the switch instruction memory 306 includes a subinstruction for each output port (in this case, five subinstructions). Each subinstruction represents a multiplexer select value which routes one of five input ports to the corresponding output port.

A program counter 308 steps through the switch instructions, interpreting control information (e.g., a condition code) in the switch instructions to perform actions such as branches or jumps based on program control flow. In a given clock cycle, the control module 304A can enable the multiplexers to move data independently onto any output port from any input port, including multicasting an input port to all output ports, as long as two input ports are not connected to the same output port in the same clock cycle.

The control module 304A is able to function as a switch processor with or without an ALU and registers. The control module 304A can include an ALU and registers to allow in-switch processing of in-flight messages. Optionally, the control module 304A can include other components such as a floating point arithmetic unit, or bit shifter, for example, to perform additional functions. The control module 304A can also be VLIW-type processor and be multithreaded.

The switches 220 include hardware and software mechanisms for providing flow control to ensure that data arriving at a full tile input buffer does not overwrite old data still pending in the buffer or cause deadlock. A switch 220 can include circuitry to detect full/empty states of buffers, and some of the wires in the data paths 104 of the static or dynamic network can be dedicated to communicating flow control information. In the dynamic network, the traffic patterns are unpredictable and there is a need for techniques for deadlock avoidance or deadlock detection and recovery. For example, buffers that become full can be overflowed into memory coupled to the switch 220 or the processor 200, or over one of the networks to off-chip memory. In the static network, the traffic patterns are controlled by the processing of switch instructions in a way that ensures correct delivery of data and avoids deadlock.

In a first approach to flow control for the static network, a processor 200 or switch 220 stalls if it is executing an instruction that attempts to read data from an empty input buffer 222 or from an empty processor output buffer, or send data to a tile with a full input buffer 222 or to a full processor input buffer. This approach ensures correctness in the presence of timing variations introduced by dynamic events such as dynamic memory references and I/O operations.

In a second approach to flow control for the static network, the switch 220 can continue to process subinstructions of a macro switch instruction if data has arrived at the corresponding input buffers, and delay processing subinstructions if the corresponding input buffer is empty. The switch 220 is also notified that an input buffer at a connected tile that receives data from a given output port is full (e.g., via a full/empty bit). The switch 220 is able to continue processing switch instructions for other output ports while suspending only that output port.

In one implementation of this second approach, there is a switch instruction memory 306 (e.g., separate memory units or separate queues within a single memory unit) and program counter 308 for each output port to enable the switch 220 to operate independently on a separate stream of switch instructions for respective output ports. For example, the switch 220 can extract the instruction streams for respective output ports from an incoming macro switch instruction stream that includes subinstructions for the respective output ports. The condition code from a macro switch instruction can be included with each corresponding subinstruction of the extracted instruction streams. Alternatively, each subinstruction can include its own condition code based on the appropriate program logic. This second approach allows data that can be forwarded without sacrificing correctness to be forwarded without further delay.

2.2 Additional Circuitry

A tile can include additional circuitry embedded within or coupled to the processor 200 and/or switch 220. The configuration of the circuitry in a tile can be controlled by local control information stored in the tile. For example, a module in the tile can be turned on or off or configured into a variety of modes based on the state of a "mode indicator" (e.g., one or more bits) stored in a register or other memory store.

A tile 102 can include various types of memory modules to serve as the instruction memory 204, data memory 206, or as a local memory store for other types of information such as control information for the tile. There can be a small SRAM bank in each tile in addition to a large SRAM bank. There can also be a larger DRAM bank in each tile. Each tile can have mode indicators used to select among these banks Any of the memory modules can be treated as a cache for a larger memory store outside the tile 102 or the integrated circuit 100. Such external memory (e.g., DRAM) is accessible over high bandwidth paths of one or more dynamic networks. The amount of memory can be chosen to roughly balance the areas devoted to processing and memory, and to match the memory access time and the processor clock.

A tile 102 can include Reconfigurable Logic (RL) that takes operands from registers and writes them back to registers after performing configurable logic operations. The RL can be used for bit-level (or "gate-level") logic, and also for multi-bit-level (e.g., byte-level) logic. The operations performed by the RL can be specified by logic-level instructions supplied to the RL.

Functions such as virtual address translation, caching, global shared memory and memory protection can be implemented by any combination of hardware and software (e.g., processor instructions). A tile 102 can include a translation look-aside buffer to translate virtual addresses as they come out of the processor 200 on each tile 102. A mode bit can turn off translation. The events such as cache miss or translation fault can trigger a trap or interrupt to the processor 200, so that the processor 200 can handle it in software. For example, there can be multiple trap lines to the processor 200. Alternatively, there are few trap lines, but there is a trap vector that the processor 200 can access which encodes the type of trap that occurred. There is a mode indicator which can allow selecting whether the software or the hardware handles these events. A hardware cache tag file can export a hit/miss status to the software rather than stalling the processor pipeline.

3 Tiled Circuit Programming Overview

A software system for the tiled integrated circuit 100 includes a compiler that is able to schedule instructions in both time and space by generating both processor and switch instructions for arranging the static network. The combination of the static network and the pipeline integration enables the compiler to orchestrate a calculation to be performed over multiple tiles with fast register-level communication between tiles. The software system can exploit both coarse-grained parallelism and fine-grained Instruction-Level Parallelism (ILP). In addition, the software system can exploit reconfigurable logic in each tile to construct operations that are uniquely suited for a particular application. This reconfigurable logic can be coded in a hardware description language such as Verilog or VHDL, or in a high-level language such as C.

The operating system (OS) for the integrated circuit 100 can be a Linux like kernel or a similar kernel running on a single tile 102. Alternatively, the OS can be a distributed OS running on multiple tiles sending messages to each of the processes on each of the tiles.

The compiler can leverage the architectural features of the integrated circuit 100 by partitioning and scheduling ILP or data-level parallelism across the tiles. The compiler is able to automatically parallelize sequential applications across multiple tiles 102. For example, outer loops can be parallelized at a coarse-grained while inner loops can be parallelized at a fine grain, much as in a vectorizing compiler. When the compiler can identify commonly occurring instruction patterns or bit operations, they can be configured into special operations that will run in a single cycle using the reconfigurable logic.

Figure 6:
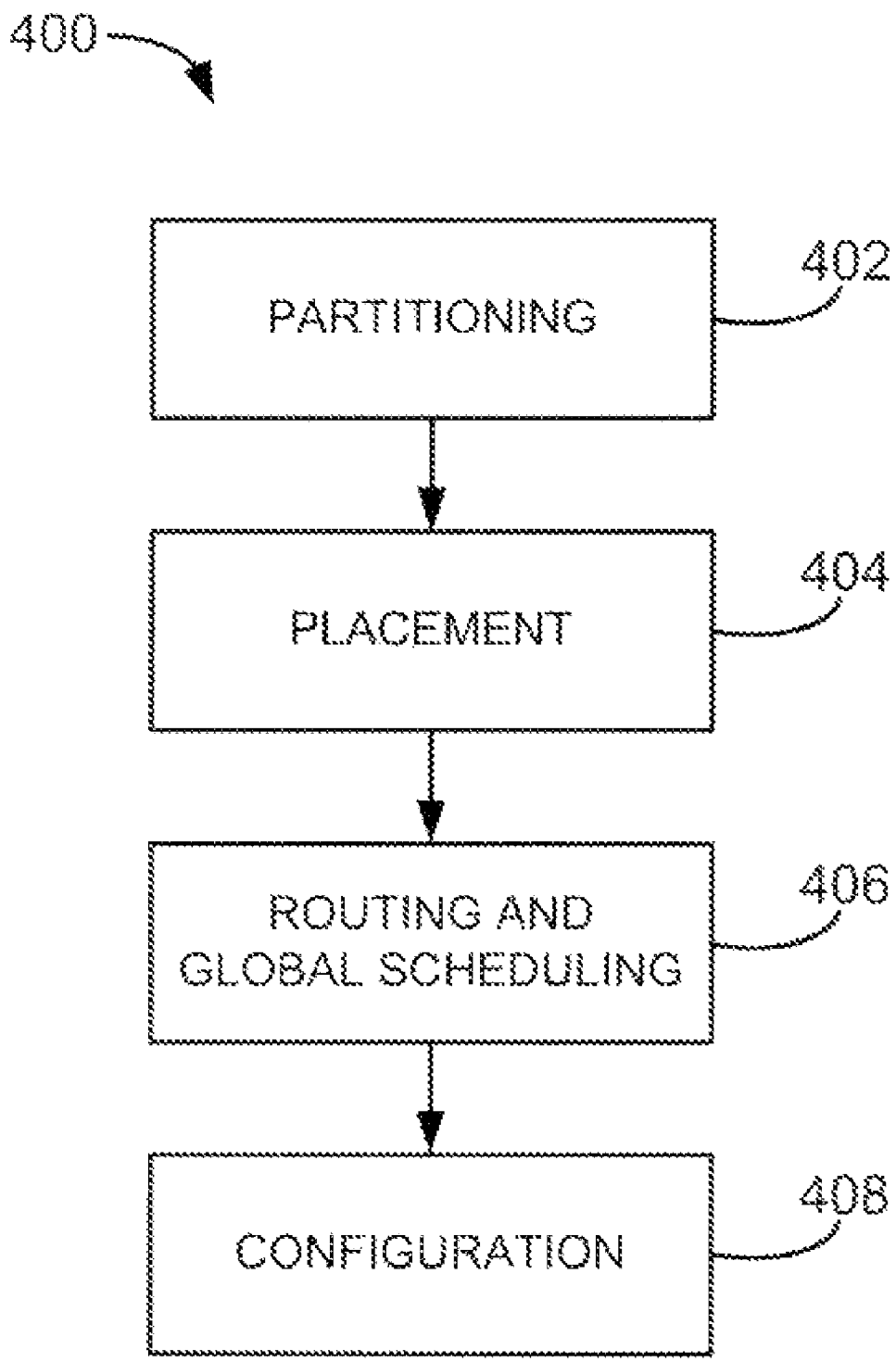
FIG. 6 is a flowchart for a compiling process.

Referring to FIG. 6, a compiling process 400 includes a number of stages. The compiler identifies and partitions for fine grain ILP in program by balancing the benefits of parallelism versus the overheads of communication and synchronization. In a partitioning phase 402, the compiler generates parallel code for a number of threads up to the number of tiles in the integrated circuit 100. In the partitioning phase 402, the compiler assumes an idealized fully-connected switch (an "ideal crossbar"), an unbounded number of virtual registers per tile, and symbolic data references. In a placement phase 404, the compiler removes the idealization of an ideal crossbar by selecting a one-to-one mapping from threads to physical tiles. The placement algorithm attempts to minimize a latency and bandwidth cost measure and can be, e.g., a variant of a VLSI cell placement algorithm. In a routing and global scheduling phase 406, the compiler allocates physical network resources with the goal of minimizing the overall estimated completion time of the program. The compiler output includes a program (e.g., a stream of instructions) for the processor 200 of each participating tile.

In an optional configuration phase 408, the compiler selects an application-specific configuration for reconfigurable logic to perform one or more custom operation. For each custom operation, the configuration compiler generates logic-level instructions for the reconfigurable logic and if necessary rewrites associated processor or switch instructions. For example, a compound operation involving multiple instructions is replaced by a call to the appropriate custom instruction using the reconfigurable logic. The compiler output includes a program (e.g., a stream of instructions) for each tile processor 200 and switch 220, and optional logic-level instructions.

Alternatively, the compiler can generate logic-level instructions based on a separate hardware description language program, as described in more detail below.

4 Pattern Matching in a Multiprocessing Environment

In the following examples of pattern matching in a multiprocessing environment, various aspects of pattern matching techniques using Finite State Automata are described in the context of the tiled integrated circuit architecture described herein. The techniques can also be applied to other multiprocessing environments.

To take advantage of the processing resources of multiple tiles to support high input stream data rates, the input stream can be divided into separate sequences (e.g., each sequence from one or more packets) that are distributed across multiple pattern matchers. Each packet can include in a header an identification number specifying which pattern matcher to use for matching the contents of that packet. A default pattern matcher can process packets that do not indicate a specific pattern matcher. When a pattern matcher retrieves data from a given packet for processing, the pattern matcher can select a predetermined portion of the packet to interpret as a character sequence. For example, the pattern matcher can select a portion that starts after the header and ends just before a known End-of-Packet (EOP) flag (e.g., a predetermined bit sequence outside of the character set being used).

Each pattern matcher can run on a different set of one or more tiles in parallel with the other pattern matchers. There may be multiple FSAs corresponding to different sets of patterns to be matched. Some of the FSAs can be statically mapped to pattern matchers on predetermined tiles, so that they are continuously available for processing the input stream. Some tiles can be used to dynamically load FSAs as needed to process a given portion of an input stream.

Figure 7A:
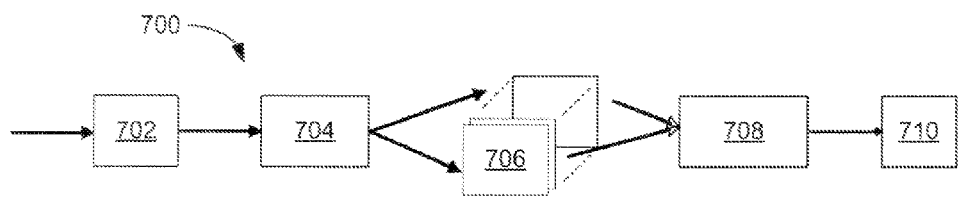
FIG. 7A is diagram of a pattern matching system.

FIG. 7A shows modules of pattern matching system 700 that include a pre-processor 702, a load balancer 704, multiple pattern matchers 706, a gathering module 708, and a post-processor 710.

Figure 7B:
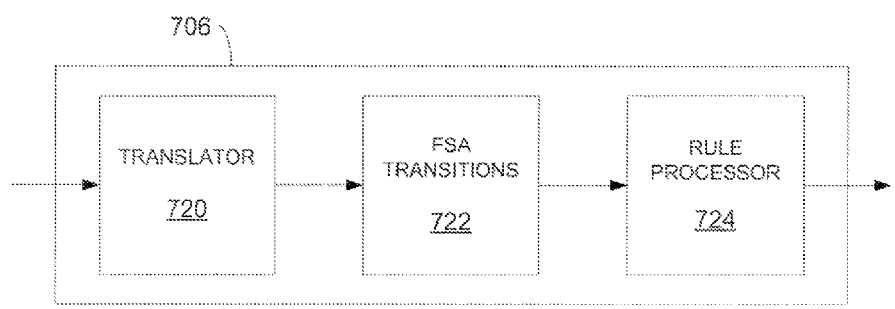
FIG. 7B is a diagram of a pattern matcher.

FIG. 7B shows an exemplary implementation of a pattern matcher 706 that includes three modules for processing an incoming sequence of characters. Each of the modules can be mapped to one or more tiles, or multiple modules can map to the same tile. A translator module 720 performs any translation of input characters that may be necessary for a given pattern matcher (e.g., converting uppercase or lowercase characters to a single case for non-case sensitive matching). A sequence of multiple characters can be translated to a single character, or one or more given characters can be removed. In some implementations, characters can be translated according to a reordering of columns in a state transition table to reduce memory storage requirements, as described in more detail below. The translator module 702 can execute on its own tile, and can queue pointers to packets to be processed, and can read the packets from memory to retrieve and translate the input characters.

An FSA transition module 722 stores data tracking the state of an FSA and performs transitions from the current state to a next state according to the input character received from the translator module 720. The FSA transition module 722 provides data indicating whether a pattern match has been found to a rule processor module 724. The rule processor module 724 is then able to determine whether there is an output rule that should be executed in response to the pattern match.

Figure 7C:
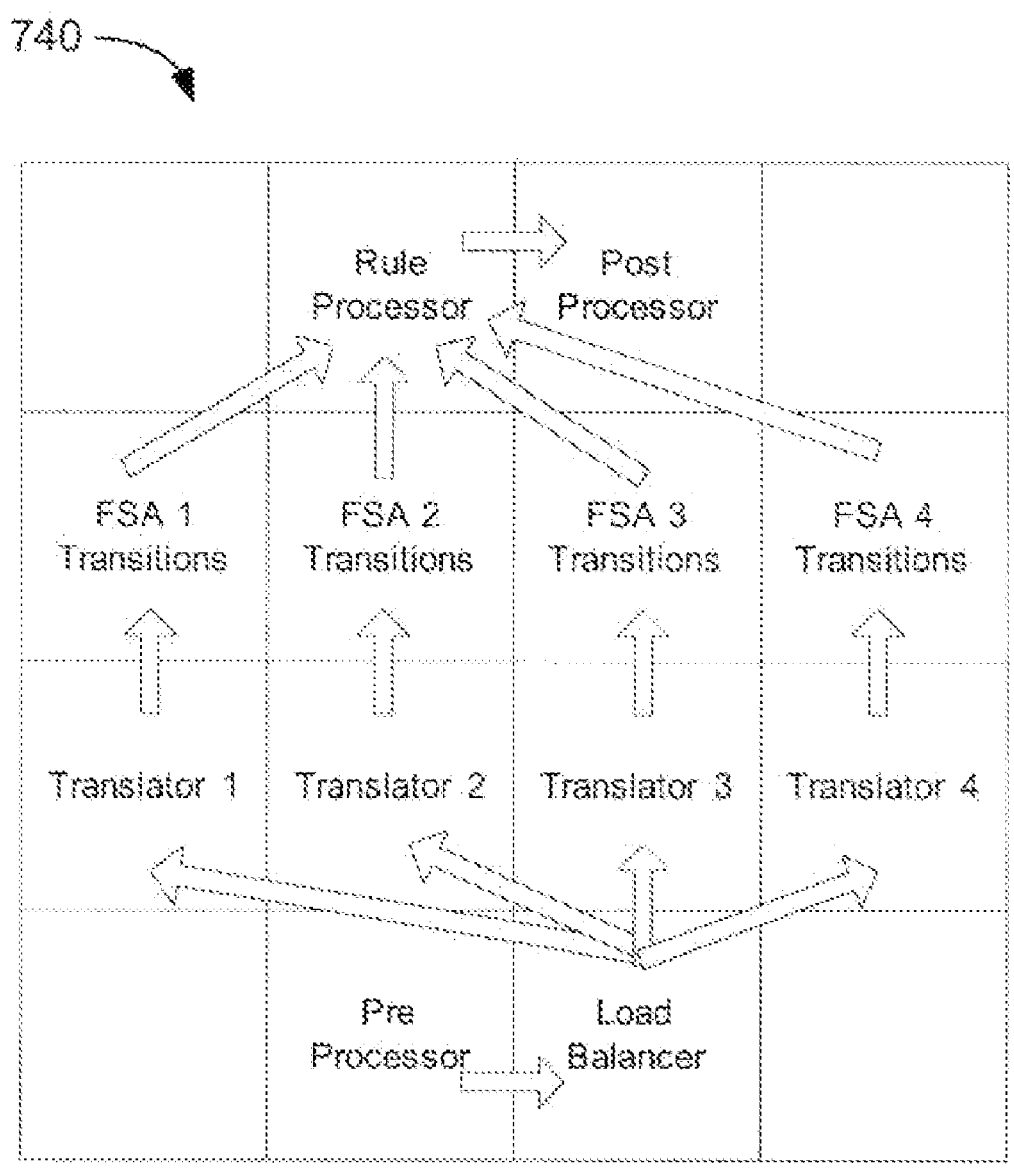
FIG. 7C is a diagram of tiles that implement modules of the pattern matching system.

FIG. 7C shows an example of how a pattern matching system with four pattern matchers 706 can be mapped to a 4-by-4 array 740 of tiles. In this example, each pattern matcher includes a corresponding translation tile and FSA transition tile, and the pattern matchers share a common rule generation tile that also serves as a gathering module to receive results from each of the FSA transition tiles. Each of the other modules runs on a single tile.

Arrows in FIG. 7C show the flow of data among the tiles. The pre-processor 702 processes a stream of packets or packet headers according to a given pattern matching application (e.g., IDS/IPS). The pre-processor tile sends data to the load balancer tile (e.g., over a static network link) that can be used to assign input character sequences to be processed by corresponding pattern matchers. For example, the load balancer tile can distribute dynamic network messages that include a pointer to a portion of a packet stored in shared memory that represents a sequence of characters to be processed by a pattern matcher. Communication from the translator tile to the FSA transition tile can be efficiently performed over a static network link. The flow control on the static network controls the rate at which the character translation tile sends data to the FSA transition tile.

Since the rate at which messages are sent to the rule processor tile may be different than the rate at which input characters are received, the FSA transition tiles transmit dynamic network messages to the rule processor tile. For example, the dynamic message can include an FSA identification number, a pointer to identify the character sequence (e.g., a packet), a character position number to identify a character within the sequence, and a rule identification number to identify a rule to be applied. The rule processor tile gathers messages from multiple pattern matchers and is able to determine which rules should be applied, and in what order they should be applied. In some cases, data is sent to the post-processor tile to perform any final tasks or to provide an appropriate output for a given application (e.g., a filtered packet stream).

In some cases, all of the instructions specifying a given FSA are stored in the local memory of the tile on which the FSA is running, which reduces the time to access the instructions and perform the state transitions. For example, in some cases each FSA can fit into a tile's instruction memory 204 and/or data memory 206. In cases in which multiple FSAs are run on the same tile, FSAs that are not likely to run concurrently can be loaded onto the same tile, and FSAs that are likely to run concurrently can be loaded onto different tiles.

If one or more of the FSAs do not fit into local memory (e.g., if the total size of all the FSAs is larger than the total local memory of all the tiles used for pattern matching) then external memory can be used to store the FSAs. The most commonly used FSAs can be mapped to fit into the local memory of some subset of the total tiles. The remaining tiles can handle the less common FSAs and load a portion of the FSA instructions, and upon cache miss retrieve additional instructions from external memory. In some cases, when the next FSA to be used is not loaded in the local memory of a tile, it can be prefetched while processing the FSA currently being used.

If a given FSA is larger than the local memory on a tile, the local memory can be used as a cache to hold the currently active portion of the FSA (e.g., state transitions for the current state and states near the current state). Alternatively, the FSA can be split into smaller FSAs each matching a subset of the patterns such that each FSA is small enough to fit into local memory of a tile. The smaller FSAs can run in parallel on different tiles. The smaller FSAs use more tiles but use less (possibly zero) network bandwidth for accessing an external memory to load additional FSA instructions.

In some cases, the patterns to be matched can change over time. FSAs for different sets of patterns can be generated before pattern matching starts and stored until they are ready to be retrieved and loaded for matching a new set of patterns. FSAs can also be generated after pattern matching begins. For example, if a given set of patterns changes after pattern matching starts, new FSAs can be generated for matching the additional patterns.

The replacement FSAs representing the new patterns to be matched can be loaded while the pattern matchers are running by using a "replacement tile" associated with an "original tile" to load a replacement FSA. When a new set of patterns are to be used at a given "change point" in an input stream, the appropriate FSA is loaded into the replacement tile and pattern matching after the change point is performed in the replacement tile. The original tile can concurrently continue to process a remaining portion of the input stream before the change point. After the original tile has completed processing that portion of the input stream, the original tile can become a replacement tile for a later change in FSA. This replacement process can occur with multiple pairs of original and replacement tiles. In some cases, all original tiles may be using the same original FSA and may all change to the same replacement FSA. In other cases, the original tiles may be running different original FSAs and multiple replacement FSAs may need to be distributed across tiles in a different manner than the original FSAs.

4.1 Mixed FSAs

Some implementations use a "mixed FSA" in which one or more of the states are associated with transitions corresponding to a DFA and one or more states are associated with transitions corresponding to an NFA. The properties of a mixed FSA can provide benefits for storage and/or access efficiency, as explained in more detail below.

In a DFA, from a given current state, each input character is associated with a transition to a single predetermined next state. Some of the transitions may be determined by default, for example, by encoding individual next state transitions for only a subset of possible input characters and specifying a default next state transition for remaining characters. However, there is a one-to-one correspondence between input characters and state transitions from any given state in a DFA.

In an NFA, from a given current state, some input characters are potentially associated with transitions to multiple next states. After transitioning from an initial state, a "failure transition" is specified from each of the other states to a predetermined "failure state." If an input character does not correspond to specified transition to a next state, the failure transition is followed and the input character is processed again from the failure state. This could result in multiple consecutive failure transitions for some input characters, and thus there is not necessarily a one-to-one correspondence between input characters and state transitions from any given state in an NFA (other than the initial state).

Figure 8A:
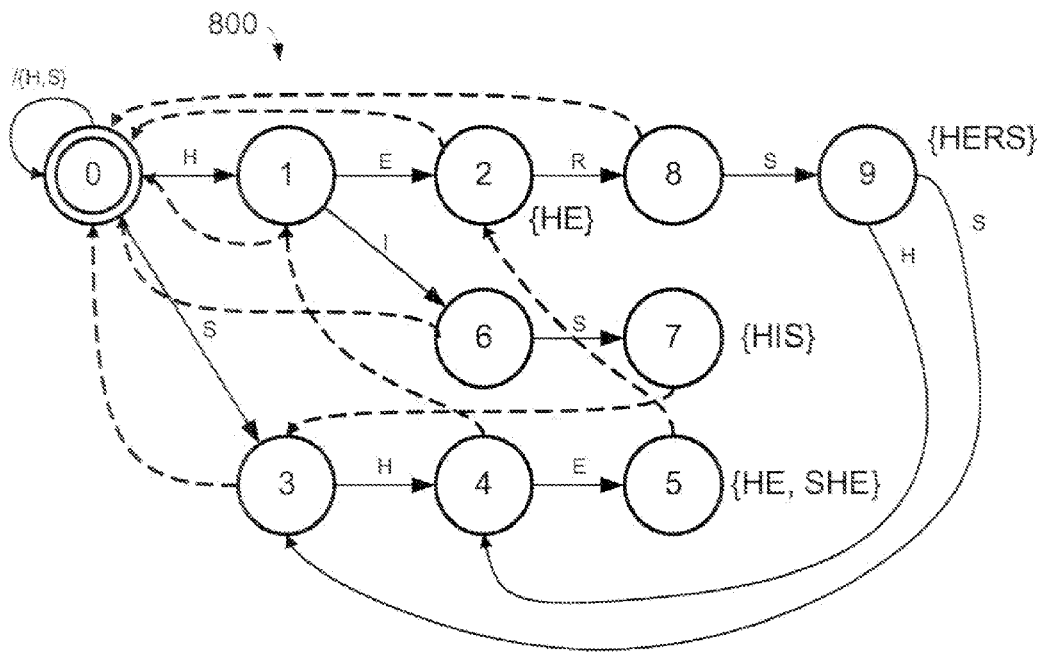
FIGS. 8A-8C are state transition diagrams.

In a mixed FSA, after transitioning from an initial state, some states have failure transitions (as in an NFA) and some states fully determine a single next state for each input character (as in a DFA). FIG. 8A shows an example of a mixed FSA sate transition diagram 800 for the keyword tree 20 of FIG. 2A. In this state transition diagram 800, "NFA states" labeled 1-8 have NFA-type next state transitions (including a dashed failure transition), and "DFA state" labeled 9 has DFA-type next state transitions (with no failure transition). As in both NFA and DFA FSAs, the initial state 0 transitions back to itself when an input character does not match an outgoing labeled transition, and the next input character is processed. In some cases, if some patterns are known to be more likely to occur in an input sequence, states associated with those patterns can be represented as DFA states for faster processing, and other states can be represented as NFA states for more efficient storage.

Figure 8B:
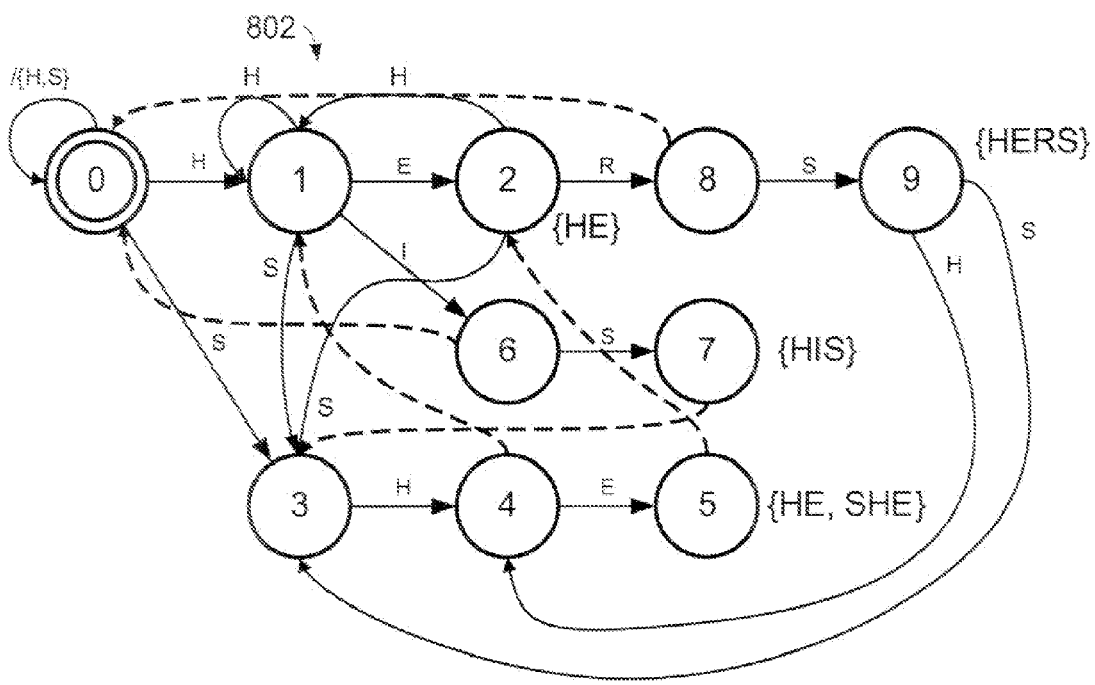

One useful property of a mixed FSA is that an NFA state that fails to a DFA state can't fail further. In some implementations, a mixed FSA uses a state transition diagram in which each NFA state fails to a DFA state. These implementations limit the uncertainty associated with processing input characters by limiting each input character to inducing at most two transitions. FIG. 8B shows an example of such a mixed FSA state transition diagram 802 for the keyword tree 20 of FIG. 2A. In this state transition diagram 802, states 1-3, and 9 are DFA states, and states 4-8 are NFA states. The DFA states each have an implicit transition to initial state 0 upon receiving an input character other than those shown.

4.2 Single Failure State FSA

Another technique for combining properties of NFAs and DFAs to provide benefits for storage and/or access efficiency is to implement an FSA based on a DFA that has some transitions removed and some NFA failure transitions added. The resulting "single failure state NFA" (SFS NFA) is a class of NFA in which all the failure transitions target the same state. In an SFS NFA the states include transitions of a corresponding DFA except for transitions that lead to direct children of the state with the largest number of incoming transitions called the "frequent state" (typically the initial state). Each state also includes a failure transition to the frequent state. Any previous DFA transitions to the frequent state (e.g., implicit transitions to the initial state) are removed and are instead handled by the failure state.

Figure 8C:
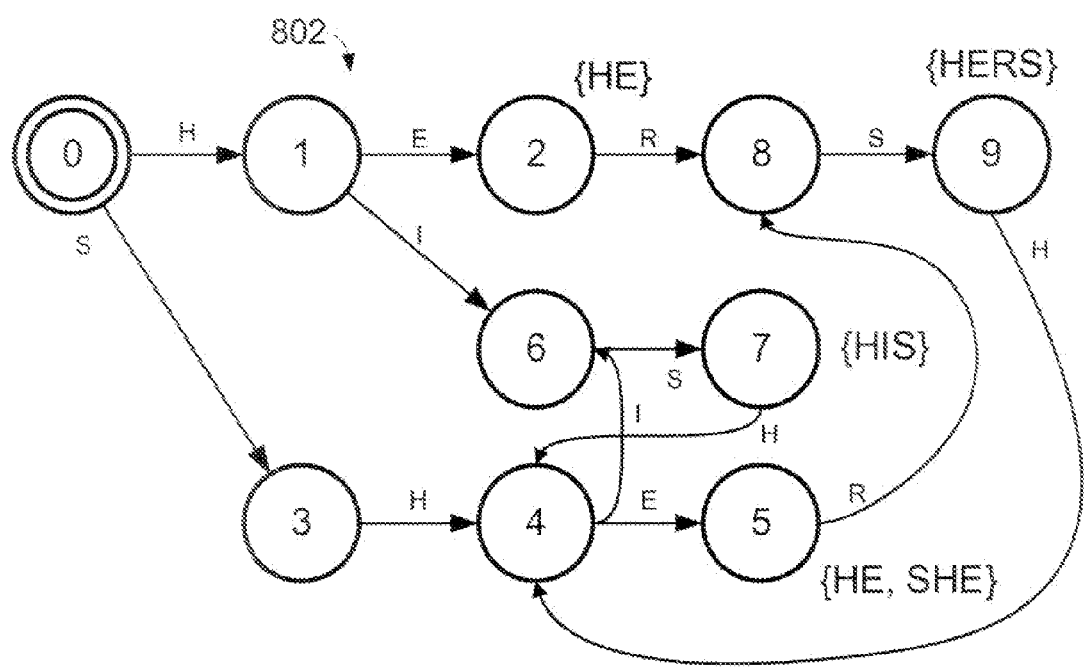

FIG. 8C shows an SFS NFA state transition diagram 804 for the keyword tree 20 of FIG. 2A. The state transition diagram 804 can be created from the state transition diagram 24 of FIG. 2C by removing transitions to state 1 and state 3, which are direct children of the initial state 0. Each state also has an implicit failure transition to state 0 (not shown in FIG. 8C). This SFS NFA has the speed performance of a DFA, but with smaller storage requirements for storing the next state transitions. For example, the state transition diagram 804 has fewer explicit transitions than any of the NFA state transition diagram 22, the DFA state transition diagram 24, or the mixed FSA state transition diagram 800. Since implicit transitions to a given state can often be encoded more efficiently, as described in more detail below, the fewer number of explicit transitions can result in a more compact representation in memory. Since the failure state is the same for each state, the next state transition information stored for each state does not need to include a failure transition. Additionally, the SFS NFA does not fail multiple times in a row resulting in a potential increase in processing speed.

4.3 FSA Encoding

Any of a variety of encoding formats can be used to store data that specifies the transitions of an FSA from any given current state to the appropriate next state for each possible input character that could be received. This data can represent a state transition table that has a first dimension corresponding to states and a second dimension corresponding to input characters. For example, a vector in the first dimension can be a column of the table that is associated with an input character and that specifies a next state transition for each possible current state upon receiving that input character. A vector in the second dimension can be a row of the table that is associated with a state and that specifies a next state transition for each possible input character that could be received in that state. Thus, an FSA transition module can determine a next state by indexing the row for the current state and the column for the received input character.

Various approaches for encoding the information in an FSA state transition table offer different trade offs between memory storage requirements and performance. A highly compressed format may reduce memory storage requirements, but may increase the time needed to access the transitions.

In one approach to encoding the state transition table, the rows in the table, each representing a state transition vector for a respective state, are encoded into state transition objects and concatenated into an array in memory. The components of the state transition vector are "state ID" values that identify a next state. For example, a state ID value that can be used to uniquely identify each state is the starting address of the encoded state transition object for that state in the array. The addresses can be absolute addresses in a memory address space, or they can be relative addresses expressed as an offset from the beginning of a file or the array data structure. The compiler encoding the state transition table can make an initial pass to determine how long each encoded state will be, and then make one or more additional passes to generate the array using the resulting state IDs. The initial size reserved for storing each state ID can be estimated from the number of states (e.g., $\lceil \log_2(\# \text{states}) \rceil$. For some states (e.g., some NFA states), the state transition object is not encoded based on a state transition vector, but on other information about the state transitions, as described in more detail below.

The characters associated with the columns of the state transition table (and components of the state transition vector for a given state) can be implicitly assigned according to numerical values of the bits representing each character. For example, in an 8-bit character set, each of the 256 values represents a predetermined character including, for example, "non-printable" control characters and "printable" letters, numbers, punctuation, and other symbols. If the ASCII character set is used, bits representing printable characters have decimal numerical values 33 to 126 (e.g., "A" to "Z" occur at 65-90 and "a" to "z" occur at 97-122). Thus, in a state transition table that has 256 columns, each input character is implicitly assigned to a given column of the state transition table (or component of a state transition vector) according to the position of the given column in the table (or position of a component in the vector). Alternatively, if the input sequences to be processed are known to use a limited subset of the characters (e.g., printable characters) a smaller number of columns can be included and implicitly assigned to that subset of characters.

A state transition vector can be encoded in a compressed format by storing a subset of the components for a corresponding subset of input characters. Transitions for other components not in the stored subset are then implicitly specified as a predetermined default state (e.g., the initial state). Since many state transition tables include many transitions to the initial state, this format can provide a high degree of compression if a large number of the initial state components can be specified implicitly in this way.

For example, in a banded format, if the default state is the initial state with a state ID of zero, a state transition vector can be encoded as a subset of consecutive components (the "band") starting with the first non-zero component and ending with the last non-zero component. This banded format excludes zero components (representing transitions to the default state) that occur before and after the band. However, the band may include some zero components. Each encoded state transition object stored in the array includes the band and position data that indicates a relative position of the band within the vector. For example, the position data can indicate at least two of: the position of the first component in the band, the position of the last component in the band, and the number of components in the band (or "band width").

To access a state transition object stored in banded format to determine the next state for a given input character, the FSA transition module locates the band in the array based on the current state ID. The module can determine whether the input character is in the band by comparing the numerical value of the input character with the first component position and the last component position. If the input character is in the band, the module can generate an index into the band by subtracting the first component position from the numerical value of the input character. The resulting indexed component of the band contains the state ID of the next state. Alternatively, the module can determine whether the input character is in the band after generating the index by ensuring the index is positive and less than the band width. If the input character is outside the band, the next state is the default state.

To reduce storage requirements further, the state ID can be a relative address from the beginning of the array in units of M bytes. In this approach, each encoded state transition object starts at a relative byte offset from the beginning of the array that is a multiple of M. A state ID is then multiplied by M to get the byte offset of the corresponding encoded state transition object. If M is selected to be a power of two, then this multiplication can be efficiently performed by a left shift. This approach reduces the number of bytes needed to store each state ID. In some cases, the cost of having each encoded state transition object start at a multiple of M bytes is some padding in between the encoded objects to get them to align to M byte boundaries.

The encoded state transition object can also be stored along with other information that can be used by the pattern matcher to process the input characters. An index into a "matching table" can be included. The matching table can be a separate data structure that includes lists of matched patterns associated with respective match states. If a state is not associated with any matched patterns (a "non-match state"), the matching table index can be set to a predetermined "non-match" value (e.g., "−1").

Alternatively, the matching table index can be omitted for non-match states to save space. In some implementations, non-match states are sorted to be beginning of the array and match states are sorted to the end. The state ID of a state at the boundary (e.g., the last non-match state or the first match state) is stored along with the sorted array. By comparing a state ID to this boundary state ID, the pattern matcher can determine whether or not to look for a stored matching table index when accessing that state.

The encoding for state transition objects can differ in other ways depending on characteristics of the corresponding state. The type of encoding for a given state transition object can be determined, for example, by a type field, or some other characteristic. Exemplary encoding types, described below, include: banded, single-output NFA, zero-output NFA, and full DFA.

4.3.1 Banded Encoding

Banded encoding can be used to encode state transition vectors for a DFA state, for an NFA state with more than one success transition, or for the initial state (in a DFA or NFA) even if it only has one success transition. The band is determined as described above, and the encoded state transition object includes: (1) the first component position, (2) a matching table index (or "−1" for no match), (3) the band width, and (4) the band of next state IDs. If the first component position is greater than or equal to 0, then the FSA transition module interprets the encoding of the state transition object as banded.

For a DFA state and for an initial state, the default state for an input character outside the band is the initial state. The state ID of the initial state does not need to be identified explicitly in the encoded state transition object. For example, the FSA transition module can look for the encoded state transition object for the initial state at a default location in the array (e.g., at the beginning of the array).

For an NFA state with more than one success transition, the default state for an input character outside the band is the failure state. Additionally, the encoded state transition object also includes a state ID or other indication of which state is the failure state targeted by the failure transition. Inside the band, the state ID stored for each input character position corresponds to a final next state reached for that input character, taking into account any failure transitions along the way. For each input character that falls within the band and would have induced a failure transition in the corresponding NFA, the compiler computes the final next state and inserts the appropriate state ID. Thus, for an NFA state with more than one success transition, the FSA transition module operates as an NFA outside the band (following any failure transitions to reprocess the same input character) and as a DFA inside the band (moving to the next input character each time).

4.3.2 Single-Output NFA Encoding

A state transition object for an NFA state with only one success transition is stored in a compact format that includes: (1) the numerical value of the single matching input character multiplied by −1 (for character sets that do not use the sign bit), (2) a matching table index (or "−1" for no match), and (3) the state ID of the failure state targeted by the failure transition of that state.

The state ID of the next state that corresponds to the single matched input character does not need to be stored in the state transition object since the state transition object for that state can be stored as the very next object in the array. So the state ID can be computed by incrementing the state ID of the current state by the size of the state transition object of the current state. For example, as the compiler generates the array for a given FSA, the keyword tree can be walked in a depth first manner so that NFA states giving one or zero success transitions are stored consecutively in the array.

4.3.3 Zero-Output NFA Encoding

An NFA state with no success transitions corresponds to a match state. The state transition object for such a state is stored in a compact format that includes: (1) a negative numerical value that is outside of the range of the character set being used (so that no match will result), (2) a matching table index, and (3) the state ID of the failure state targeted by the failure transition of that state.

4.3.4 Full DFA Encoding

In some cases, it is beneficial to encode some state transition vectors as a full vector that includes an explicit state ID for every possible input character. For example, in a mixed FSA, every state that can be the failure target of an NFA state (i.e., some NFA state's failure transition targets the state) is encoded as a full DFA state transition vector. The result of this is that any state can only fail back one state. The FSA transition module is then able to look up the state ID of the next state based on both (1) the state transition object for the current state, and (2) the state transition object of the failure state in parallel and choose which state becomes the next state when we determine if the input character was inside or outside the band of the current state.

4.3.5 Alternative Encoding Techniques

Various alternative techniques can be used to provide, for example, greater compression of the stored state transition information, or faster access speed.

In a partial-banded encoding format, all bands include the first component of the full state transition vector and the last non-default state component. In this encoding format, the encoded state transition object does not need to store the first component position. The size of the object may decrease or increase depending on whether the band width increases. This encoding format avoids the need to subtract the first component position from the numerical value of the input character to generate an index into the band, speeding access time.

The order in which the state transition objects are stored in the array can be selected to improve cache utilization by placing objects for states directly linked by a transition near each other (e.g., in adjacent locations) in the array. The order can also be selected to reduce the padding that would otherwise be necessary in order to ensure that objects align to M byte boundaries.

4.4 Character Translation

A translator module performs any translation of input characters that may be necessary for a given pattern matcher. The translator module can determine what translation is to be performed by using an input character as an index into a translation table that provides a mapping from any given character to a translated character (possibly the same character). The table can also include entries for data expected in an input stream other than characters. For example, if an 8-bit character set with 256 characters is used, the translation table can include 257 entries to allow mapping of an End-of-Packet character (e.g., −1) to itself. Each pattern matcher can store its own translation table. There can be a shared translation table for multiple pattern matchers. In some implementations, a pattern matcher can use the shared translation table by default and optionally override it with a custom table if one is stored.

One form of translation includes converting uppercase or lowercase characters to a single case for case-insensitive matching. For example, lower-case characters can be converted to upper case for case-insensitive matching. For case-sensitive matching, the translator module may simply retrieve the input characters without performing translation, or may optionally perform other forms of translation, as described below.

Various approaches can be used for case-insensitive matching in which a given letter in a pattern can be matched to either the upper case or lower case version of the letter. In one approach, the stored data representing a state transition table for the FSA includes the same next state transition for the upper and lower case versions of each letter. In this approach, it is not necessary to translate the input character sequence, but memory space is being used to store redundant information.

In another approach to case-insensitive matching, the letters of the patterns can be converted to upper case before generating the data representing the state transition table, and the translator module can translate lower case letters in the input character stream to upper case. The state transition table includes next state transitions for upper case letters, and the 26 columns that would otherwise correspond to lower case letters do not need to be included in the state transition table, reducing the size of the encoded data representation of the table (e.g., the banded or full DFA encoding formats).

In some situations, some of the patterns may be designated for case-sensitive matching, and some of the patterns for case-insensitive matching. In such situations, a pattern matcher can be implemented using two FSA, one for case-sensitive patterns and one for case-insensitive patterns. Both FSAs can be run in parallel.

Another form of translation includes translating characters according to a reordering of columns in a state transition table to reduce memory storage requirements. Since the order of the columns of a state transition table can be arbitrarily permuted without affecting the behavior of the corresponding FSA, the compiler can select an order for the columns based on criteria such as reducing the average size of the bands in the banded encoding format. If a state transition table tends to have rows with a large number of zero components between non-zero components, the compiler can reorder the columns so that many of those zero components are moved outside the band for most rows in a permuted state transition table that is used to generate the encoded representation. This reduces the average band width and the amount of memory needed to store the array of encoded state transition objects. In order to map the input characters to the correct column of the permuted state transition table, the translator module can translate each input character according to the change in position of a corresponding column between the original state transition table and the permuted state transition table.

Another form of translation includes translating each "unused character" not appearing in any of the patterns to the same character, since they all have the same effect in the FSA of not matching any pattern. This reduces the size of the alphabet of possible input characters, which reduces the size of the state transition tables and resulting data encoding the tables.

Another form of translation includes removing one or more characters (i.e., translating a given character sequence to a shorter character sequence). For example, the translator module can compact sequences of unused characters. An unused character will cause a transition to the initial state (state 0) in the FSA. No partial pattern matches yet exist in state 0. Thus, a sequence of multiple unused characters can be reduced to one of the unused character before being processed by the FSA and will result in the same set of patterns being matched. The first unused character causes a transition from any state to state 0 and any subsequent unused characters transition from state 0 to state 0. Removing these subsequent unused characters avoids this state transition processing that would have occurred downstream if the unused characters had been left in the character stream. This form of translation can be implemented, for example, by first performing the translation described above of mapping unused characters to the same unused character (e.g., "0"), followed by converting a sequence of multiple 0's to one 0. After receiving two 0's in a row, the translation module would not output the single 0 character until receiving a different character.

The translator module can also count the number D of "used characters" (characters that do appear in at least one pattern) that occur between two consecutive unused characters. If D is less than the minimum length pattern, then no pattern could fit in those D characters. The two unused characters and the D used characters in between can be reduced to one unused character with no change in the patterns found.

4.5 Rule Processing

The rule processor module receives messages from the FSA transition module over the dynamic network that each include an FSA identification number, a pointer to identify a stored character sequence (e.g., a packet), a character position number to identify a character within the sequence, and (optionally) a rule list number. In some implementations, these messages are sent only when the FSA transition module transitions to a particular state (e.g., a match state). Since a match state can correspond to matching multiple patterns, a data structure can be stored that provides a rule list for each match state of the patterns that are matched when that state is entered. The rule processor module uses the rule list number to index into the data structure to retrieve the appropriate list of rules to execute. For example, some rules can indicate that the rule processor module should send a message to a registered client. In some implementations there is one tile that implements the rule processor module for all the FSA transition modules. Alternatively, multiple tiles can be used to provide more processing capacity.

4.6 Input Stream Processing

In some cases multiple tiles can be used to run the same pattern matcher to check for patterns in respective portions of an input stream in parallel. A given input sequence of characters can be divided up into smaller segments. The segments can be distributed in round-robin distribution for execution on a respective pattern matcher, each implemented on one or more tiles. Each segment can be matched to patterns independently from the other segments, except for patterns that cross from one segment into the next segment.

In an example of an approach for finding these patterns, seg[1], . . . , seg[N] are a group of N segments that are respectively distributed to N pattern matchers. In this example, the longest pattern has length $P_{max}$. A load balancer generates the segments from the sequence of input characters by appending the first $P_{max}-1$ characters from the next segment seg[n+1] to the end of the current segment seg[n]. This increases the number of characters to be searched by $(P_{max}-1)(N-1)$ for each group of segments. If a character not used in any pattern is encountered within the last $P_{max}-1$ characters, pattern matching for that segment can stop at that point since the purpose of searching those appended characters is to find patterns that cross between segments.

This approach can result in finding the same pattern twice, for those patterns that begin and end within the first $P_{max}-1$ characters of a segment. One of each pair of double-matched patterns can be filtered out by a common rule processor module or other gathering module that receives potential pattern matches from the pattern matchers. For example, the module can filter out matches for which the first character position is within the last $P_{max}-1$ characters of a segment.

To find patterns that cross the boundary between the end of the last segment seg[aN] in a first group of N segments and the beginning of the first segment seg[aN+1] in the next group of N segments, the pattern matchers handling those segments can share state information. The FSA state reached at the end of processing seg[aN] can be used as the starting state for processing seg[aN+1].

Other approaches for handling these cross-segment patterns can be used. Other approaches can include implementing a dedicated FSA for finding these patterns.

Various features of the tiled integrated circuit architecture and programming described herein can be implemented by modifying versions of the tiled integrated circuits described in the following publications: "Baring It All to Software: RAW Machines" *IEEE Computer*, September 1997, pp. 86-93, "Space-Time Scheduling of Instruction-Level Parallelism on a Raw Machine," *Proceedings of the Eighth International Conference on Architectural Support for Programming Languages and Operating Systems (ASPLOS-VIII)*, San Jose, Calif., Oct. 4-7, 1998, "Raw Computation" *Scientific American*, August 1999, Vol. 281, No. 2, pp. 44-47, "The Raw Microprocessor: A Computational Fabric for Software Circuits and General Purpose Programs," *IEEE Micro*, March/April 2002, pp. 25-35, and "A 16-issue multiple-program-counter microprocessor with point-to-point scalar operand network," *Proceedings of the IEEE International Solid-State Circuits Conference*, February 2003, each of which is incorporated herein by reference.

It is to be understood that the foregoing description is intended to illustrate and not to limit the scope of the invention, which is defined by the scope of the appended claims. Other embodiments are within the scope of the following claims.

What is claimed is:

1. A method for pattern matching in a plurality of interconnected processing engines, comprising:

accepting at least one input sequence of symbols over an interface;

accepting a specification of transitions among states associated with a finite state automaton for matching an input sequence to one or more patterns, the specification comprising a state transition table having a first dimension corresponding to states and a second dimension corresponding to input symbols, with each transition being associated with at least one symbol, with multiple subsets of transitions comprising vectors in the first dimension each associated with a respective input symbol and specifying next state transitions for each current state, and with the input symbol associated with a given vector in the first dimension of the state transition table being determined by the position of the given vector in the table;

selecting an order associated with the vectors that is different from the order of the vectors in the state transition table;

storing data that specifies the transitions according to the selected order; and performing pattern matching in a plurality of interconnected processing engines including determining whether the accepted input sequence matches a pattern based on the stored data, with the determining including, for at least one input symbol in the accepted input sequence:

translating the input symbol in the accepted input sequence to a different symbol according to the change in position of a given vector between the order defined by the state transition table and the order defined by the stored data, determining one of the vectors that corresponds to the translated input symbol, and determining a transition from a current state to a next state based on the determined vector and the stored data.

2. The method of claim 1, wherein the order associated with the vectors is selected based on reducing the size of the stored data that specifies the transitions.

3. The method of claim 1, wherein the data that specifies the transitions according to the selected order comprises:

a subset of consecutive components of a vector in the second dimension of the state transition table associated with a current state and specifying next state transitions for each input symbol that excludes transitions to an initial state of the finite state automaton before and after the subset, and data that indicates a relative position of the subset of consecutive components within the vector.

4. The method of claim 1, wherein the data that indicates the relative position includes the smallest of the relative positions of the consecutive components.

5. The method of claim 4, wherein the data that indicates the relative position further includes the largest of the relative positions of the consecutive components.

6. The method of claim 4, wherein the data that indicates the relative position further includes data based on the number of consecutive components in the subset.

7. The method of claim 1, wherein translating the input symbol in the accepted input sequence further comprises translating uppercase and lowercase versions of letters into a single case.

8. The method of claim 1, wherein translating the input symbol in the accepted input sequence further comprises translating each of multiple symbols not appearing in the patterns into a single symbol not appearing in the patterns.

9. The method of claim 8, wherein translating the input symbol in the accepted input sequence further comprises translating two symbols not appearing in the patterns and all the symbols between them into a single symbol not appearing in the pattern if the number of symbols between them are fewer than the minimum number of symbols in any of the patterns.

10. The method of claim 1, wherein the order associated with the vectors is selected based on placing a first portion of the stored data that specifies transitions from a first state close to a second portion of the stored data that specifies transitions from a second state, wherein there is at least one transition from the first state to the second state.

11. The method of claim 10, wherein the first portion and the second portion are stored close enough to be mapped to the same cache line.

12. The method of claim 1, in which:
accepting at least one input sequence of symbols over the interface includes accepting a stream of input sequences over the interface and storing the input sequences;
storing the data includes storing instructions for matching an input sequence to one or more patterns in memory accessible by a first set of one or more processing engines, and storing instructions for matching an input sequence to one or more patterns in memory accessible by a second set of one or more processing engines; and
performing pattern matching includes
distributing information identifying selected input sequences to the first and second sets of processing engines, and
retrieving the identified input sequences to perform pattern matching in the first and second sets of processing engines.

13. The method of claim 12, further comprising assigning input sequences to the first and second sets of processing engines based on status information from the sets of processing engines.

14. The method of claim 13, wherein the status information comprises an indication of a work load on a set of processing engines.

15. The method of claim 14, wherein information identifying an accepted input sequence is distributed to a set of processing engines that have the lowest work load.

16. The method of claim 14, wherein the indication of the work load comprises at least one of a number of input sequences currently being processed and a number of input sequences in an input queue.

17. The method of claim 12, further comprising assigning input sequences to the first and second sets of processing engines based on an identified class of a packet that includes the input sequence.

18. The method of claim 17, wherein at least one of the sets of processing engines is dedicated to performing pattern matching for input sequences in packets of a corresponding class.

19. The method of claim 12, further comprising gathering results of the pattern matching performed by the first set of one or more processing engines and the second set of one or more processing engines.

20. The method of claim 12, wherein the instructions stored in the memory accessible to the first set of processing engines comprise a program corresponding to a finite state automaton.

21. The method of claim 20, wherein the finite state automaton includes states corresponding to a keyword tree of a Aho-Corasick pattern matching technique.

22. The method of claim 20, wherein the memory accessible to the first set of processing engines stores data specifying transitions among states associated with the finite state automaton.

23. The method of claim 20, wherein the first set of processing engines performs a first of the following functions in a first subset of the processing engines and a second of the following functions in a second subset of the processing engines that does not overlap with the first subset:
translating symbols within an input sequence based on an order associated with subsets of the specified transitions;
determining a transition from a current state to a next state based on a translated symbol and the stored data; and
determining an output rule in response to determining that an input sequence matches a pattern.

24. The method of claim 23, wherein the first set of processing engines performs all three of the functions in different non-overlapping subsets of processing engines.

25. The method of claim 23, wherein translating symbols within an input sequence further comprises translating uppercase and lowercase versions of letters to a single case.

26. The method of claim 20, wherein the finite state automaton includes one or more states associated with transitions corresponding to a deterministic finite automaton and one or more states associated with transitions corresponding to a non-deterministic finite automaton.

27. The method of claim 12, wherein the memory accessible by the first set of processing engines and the memory accessible by the second set of processing engines comprise memory caches within the respective processing engines.

28. The method of claim 27, wherein the instructions stored in the memory accessible by the first set of processing engines comprise an active portion of a program corresponding to a finite state automaton.

29. The method of claim 27, wherein the instructions stored in the memory accessible by the first set of processing engines comprise at least a portion of a program corresponding to a finite state automaton for matching a first set of patterns, and the instructions stored in the memory accessible by the second set of processing engines comprise at least a portion of a program corresponding to a finite state automaton for matching a second set of patterns different from the first set of patterns.

30. The method of claim 27, further comprising processing a specification of transitions among states associated with a finite state automaton for matching an input sequence to one or more patterns to generate data specifying the transitions based on storage constraints of the memory caches of the first set of processing engines.

31. The method of claim 30, wherein the data is small enough to fit in the memory caches of the first set of processing engines.

32. The method of claim 30, wherein processing the specification of transitions to generate the data based on the storage constraints comprises selecting an order associated with subsets of the transitions.

33. The method of claim 30, wherein processing the specification to generate the data based on the storage constraints comprises generating a representation of the finite state automaton in which one or more of the states are associated with transitions corresponding to a deterministic finite automaton and one or more states are associated with transitions corresponding to a non-deterministic finite automaton.

34. The method of claim 12, wherein the instructions stored in the memory accessible by the first set of processing engines comprise at least a portion of a first program corresponding to a first finite state automaton, and the instructions stored in the memory accessible by the second set of processing engines comprise at least a portion of a second program corresponding to a second finite state automaton different from the first finite state automaton.

35. The method of claim 34, wherein the instructions stored in the memory accessible by the first set of processing engines are stored before the stream of input sequences are accepted over the interface.

36. The method of claim 35, wherein the instructions stored in the memory accessible by the second set of processing engines are stored after at least some of the input sequences have been accepted over the interface.

37. The method of claim 34, wherein the instructions stored in the memory accessible by the first set of processing engines are stored after at least some of the input sequences have been accepted over the interface.

38. The method of claim 34, wherein the instructions stored in the memory accessible by the first set of processing engines are stored while the second set of processing engines are processing input sequences.

39. The method of claim 38, wherein the first set of processing engines starts processing input sequences according to its stored instructions after the second set of processing engines finishes processing input sequences according to its stored instructions.

40. The method of claim 34, wherein the first finite state automaton matches an input sequence to one or more case-sensitive patterns.

41. The method of claim 40, wherein the second finite state automaton matches an input sequence to one or more case-insensitive patterns.

42. The method of claim 12, wherein the input sequences comprise segments of a character stream.

43. The method of claim 42, wherein the first and second sets of processing engines perform pattern matching to the same patterns.

44. The method of claim 43, wherein at least some of the segments include the same portion of the character stream.

45. The method of claim 44, wherein each set of processing engines processes a given segment starting from an initial state.

46. The method of claim 44, wherein at least some of the segments processed by the first set of processing engines include the same portion of the character stream as a segment processed by the second set of processing engines.

47. The method of claim 46, wherein the portion of the character stream that is the same in a first segment and a second segment is one character shorter than a maximum length of the patterns being matched in the first and second sets of processing engines.

48. The method of claim 44, further comprising gathering results of the pattern matching performed by the first set of one or more processing engines and the second set of one or more processing engines.

49. The method of claim 48, wherein gathering results of the pattern matching includes filtering the results to identify a portion of the character stream matched in more than one input sequence.

50. The method of claim 43, wherein each set of processing engines processes a given segment starting from a state determined after processing a previous segment.

51. The method of claim 12, wherein at least some of the input sequences each comprise at least a portion of a packet.

52. The method of claim 51, wherein at least some of the input sequences each comprise a payload of a packet.

53. The method of claim 1,
wherein one or more of the states are associated with transitions corresponding to a deterministic finite automaton and one or more states are associated with transitions corresponding to a non-deterministic finite automaton.

54. The method of claim 53, wherein at least some of the transitions corresponding to a non-deterministic finite automaton fail to a state associated with transitions corresponding to a deterministic finite automaton.

55. The method of claim 54, wherein all of the transitions corresponding to a non-deterministic finite automaton fail to a state associated with transitions corresponding to a deterministic finite automaton.

56. The method of claim 53, wherein all of the transitions corresponding to a non-deterministic finite automaton fail to the same failure state.

57. The method of claim 56, wherein the failure state comprises an initial state of the finite state automaton.

58. The method of claim 56, wherein the failure state comprises a state to which the largest number of transitions terminate.

59. The method of claim 56, wherein the finite state automaton does not include any direct transitions to children of the failure state from a state other than the failure state.

60. The method of claim 53, wherein determining whether the accepted input sequence matches the pattern comprises, for a given symbol in the input sequence, accessing a first portion of the stored data that determines a transition from a current state in parallel with accessing a second portion of the stored data that determines a transition from a state to which the current state transitions if the given symbol fails to match a specified transition from the current state.

61. The method of claim 60, wherein accessing the first and second portions of the stored data in parallel comprises accessing the first and second portions in different execution units of a processing engine.

62. The method of claim 60, wherein accessing the first and second portions of the stored data in parallel comprises accessing the first and second portions in different processing engines of an interconnected network of processing engines.

63. The method of claim 60, wherein accessing the first and second portions of the stored data in parallel comprises overlapping execution of instructions associated with accessing the first and second portions in a pipeline.

64. A system for pattern matching, comprising:

a plurality of interconnected processing engines;

an interface to at least one of the processing engines configured to accept at least one input sequence of symbols; and memory accessible by one or more of the processing engines that stores data that specifies transitions among states associated with a finite state automaton for matching an input sequence to one or more patterns, based on an accepted specification comprising a state transition table having a first dimension corresponding to states and a second dimension corresponding to input symbols, with each transition being associated with at least one symbol, with multiple subsets of transitions comprising vectors in the first dimension each associated with a respective input symbol and specifying next state transitions for each current state, and with the input symbol associated with a given vector in the first dimension of the state transition table being determined by the position of the given vector in the table;

at least one of the processing engines being configured to translate input symbols in the input sequence according to a selected order associated with the vectors that is different from the order of the vectors in the state transition table; and at least one of the processing engines being configured to determine whether the accepted input sequence matches a pattern based on the stored data that specifies the transitions, with the determining including, for at least one input symbol in the accepted input sequence:

translating the input symbol in the accepted input sequence to a different symbol according to the change in position of a given vector between the order defined by the state transition table and the order defined by the stored data, determining one of the vectors that corresponds to the translated input symbol, and determining a transition from a current state to a next state based on the determined vector and the stored data.

65. The system of claim 64, wherein translating the input symbol in the accepted input sequence further comprises translating uppercase and lowercase versions of letters into a single case.

66. The system of claim 64, wherein translating the input symbol in the accepted input sequence further comprises translating each of multiple symbols not appearing in the patterns into a single symbol not appearing in the patterns.

67. The system of claim 64, in which:

the interface is configured to accept a stream of input sequences;

the memory accessible by one or more of the processing engines includes memory accessible by a first set of one or more processing engines that stores instructions for matching an input sequence to one or more patterns, and memory accessible by a second set of one or more processing engines that stores instructions for matching an input sequence to one or more patterns;

at least one processing engine is configured to distribute information identifying selected input sequences to the first and second sets of processing engines; and the first and second sets of processing engines are configured to retrieve the identified input sequences to perform pattern matching.

68. The system of claim 67, wherein at least one processing engine is configured to assign input sequences to the first and second sets of processing engines based on status information from the sets of processing engines.

69. The system of claim 68, wherein the status information comprises an indication of a work load on a set of processing engines.

70. The system of claim 67, wherein at least one processing engine is configured to assign input sequences to the first and second sets of processing engines based on an identified class of a packet that includes the input sequence.

71. The system of claim 67, wherein at least one processing engine is configured to gather results of the pattern matching performed by the first set of one or more processing engines and the second set of one or more processing engines.

72. The system of claim 67, wherein the instructions stored in the memory accessible to the first set of processing engines comprise a program corresponding to a finite state automaton.

73. The system of claim 72, wherein the finite state automaton includes states corresponding to a keyword tree of a Aho-Corasick pattern matching technique.

74. The system of claim 64, wherein one or more of the states are associated with transitions corresponding to a deterministic finite automaton and one or more states are associated with transitions corresponding to a non-deterministic finite automaton.

75. The system of claim 74, wherein at least some of the transitions corresponding to a non-deterministic finite automaton fail to a state associated with transitions corresponding to a deterministic finite automaton.

76. The system of claim 75, wherein all of the transitions corresponding to a non-deterministic finite automaton fail to a state associated with transitions corresponding to a deterministic finite automaton.

77. The system of claim 74, wherein all of the transitions corresponding to a non-deterministic finite automaton fail to the same failure state.

\* \* \* \* \*